US008875177B1

(12) United States Patent
Sharma et al.

(10) Patent No.: US 8,875,177 B1
(45) Date of Patent: Oct. 28, 2014

(54) SERVING VIDEO CONTENT SEGMENTS

(71) Applicant: Google Inc., Mountain View, CA (US)

(72) Inventors: Amit Sharma, Fremont, CA (US); Jonathan Goldman, San Francisco, CA (US); Anand Rangarajan, Santa Clara, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/795,499

(22) Filed: Mar. 12, 2013

(51) Int. Cl.
*H04N 7/10* (2006.01)
*H04N 21/458* (2011.01)

(52) U.S. Cl.
CPC .................................. *H04N 21/458* (2013.01)
USPC ......... 725/34; 705/5; 705/10; 705/14; 705/25

(58) Field of Classification Search
None
See application file for complete search history.

(56) References Cited

U.S. PATENT DOCUMENTS

| 2004/0194127 | A1* | 9/2004 | Patton et al. ..................... 725/32 |
| 2007/0157228 | A1 | 7/2007 | Bayer et al. |
| 2007/0256095 | A1* | 11/2007 | Collins ........................... 725/34 |
| 2008/0066107 | A1 | 3/2008 | Moonka et al. |
| 2008/0243617 | A1* | 10/2008 | Song et al. ....................... 705/14 |
| 2009/0006375 | A1* | 1/2009 | Lax et al. .......................... 707/5 |
| 2009/0055273 | A1* | 2/2009 | Miyazawa ...................... 705/14 |
| 2009/0106787 | A1* | 4/2009 | Maissel et al. ..................... 725/9 |
| 2009/0327032 | A1* | 12/2009 | Gunawardana et al. ........ 705/10 |
| 2011/0099195 | A1 | 4/2011 | Patwardhan et al. |
| 2011/0213655 | A1* | 9/2011 | Henkin et al. ............. 705/14.49 |

* cited by examiner

*Primary Examiner* — Nasser Goodarzi
*Assistant Examiner* — Adil Ocak
(74) *Attorney, Agent, or Firm* — Foley & Lardner LLP; John D. Lanza

(57) ABSTRACT

A method, executed on a processor, for serving a video content segment at an online resource, includes receiving a request for a video content segment; identifying one or more candidate video content segments to serve in response to the request; accessing a quality factor (QF) and a bid for each of the candidate video content segments; ranking the candidate video content segments based on a combination of each of the video content segments' QF and bid; and providing in response to the request, a set of candidate video content segments based on the ranking.

24 Claims, 16 Drawing Sheets

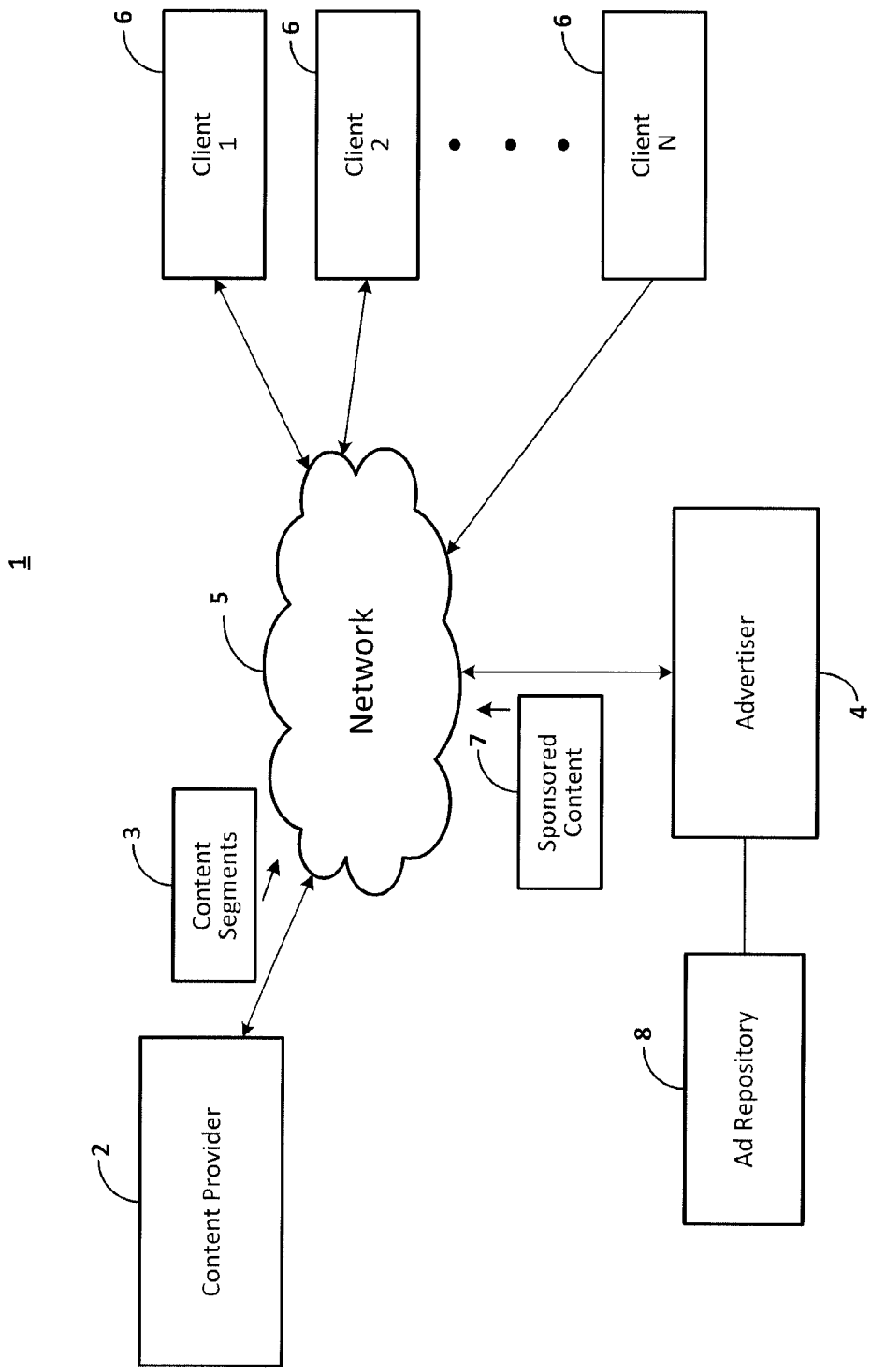

SERVING VIDEO CONTENT SEGMENTS

BACKGROUND

Online resources such as Internet Web pages provide opportunities for companies to market their products and services and to build brand awareness. These opportunities may be met when a company succeeds in getting information about its products and services posted on the Web pages. An example of such a Web page displays video programs, and may be a search results Web page that displays the results of an online resource query for specific video programs. In addition to display the video program search results, the search results Web page also may display content segments, including video content segments, which the company has produced to publicize its products and services. One typical mechanism for selecting which content segments should be served with the search results Web page involves an auction in which companies submit bids for the placement of their content segments. A higher bid ordinarily enhances the chances of an advertisement being selected.

In the auction system, a company may enter bids, using a cost-per-click (CPC) basis or cost-per-thousand impression (CPM) basis, where a CPM bid may be converted to an estimated CPC bid by multiplying the CPM bid with a click-through rate for the content segment and a set of relevant keywords for a content segment the company desires to promote. Content segments in the auction then may be selected for display on the Web page based on keyword matching and the amount bid by the company. However, this auction system does not always provide the best match of the Web page's content and selected content segments.

For example, video advertisements for promoted video programs (PVP) may be displayed on a video program search results Web page. The video advertisements may look and behave like organic search results for video programs, and essentially may be static advertisements with thumbnail images and one or more lines of text. At the time of serving these video advertisements with a Web page, the video advertisements may be treated in the same manner as static advertisements. However, the video advertisements for promoted video programs may include links to another Web site and Web page on which the promoted video program is displayed. Current auction systems may consider only keywords associated with the video advertisement as displayed on the search results Web page, but may not consider the content of the promoted video program that is linked to the video advertisement. Thus, current auction systems may not be effective in selecting relevant video advertisements to serve on a video search results Web page.

To overcome the above described limitations with current auction systems for selecting video advertisements, including video advertisements for promoted video programs, disclosed herein are systems and methods that take into account the content and associated data and metadata of the promoted video program linked to the video advertisement. The systems and methods improve video advertisement selection by considering unique video features, signals, and advertisement metadata, some or all of which may be extracted from the promoted video programs. The systems and methods further may take into account promoted video program physical characteristics such as length of a promoted video program, noisiness of a promoted video program, optical characteristics of a promoted video program such as contrast, and other promoted video program features and dimensions.

SUMMARY

A method, executed on a processor, for serving a video content segment at an online resource, includes receiving a request for a video content segment; identifying one or more candidate video content segments to serve in response to the request; accessing a quality factor (QF) and a bid for each of the candidate video content segments; ranking the candidate video content segments based on a combination of each of the video content segments' QF and bid; and providing in response to the request, a set of candidate video content segments based on the ranking.

DESCRIPTION OF THE DRAWINGS

The detailed description refers to the following figures in which like numerals refer to like items, and in which:

FIGS. 1A and 1B illustrate example environments in which video content segments may be served at online resources;

DETAILED DESCRIPTION

Online resources such as Internet Web pages provide opportunities for companies to market their products and services and to build brand awareness. These opportunities may be met when a company succeeds in getting information about its products and services posted on the Web pages. An example of such a Web page displays video programs, and may be a search results Web page that displays the results of an online resource query for specific video programs. In addition to display the video program search results, the search results Web page also may display content segments, including video content segments, which the company has produced to publicize its products and services. One typical mechanism for selecting which content segments should be served with the search results Web page involves an auction in which companies submit bids for the placement of their content segments. A higher bid ordinarily enhances the chances of an advertisement being selected.

In an embodiment of a video content segment auction process, advertisers are presented with an advertisement request, and in response submit, on-the-fly, a bid that identifies a video advertisement having a linked promoted video program. An analytics service then may evaluate the video advertisement and the linked promoted video program and, considering the bid, may rank the video advertisements based on criteria agreed upon among the advertiser, the owner of the online resource at which the video advertisement will be displayed, and the producer of the promoted video program (who may be the advertiser).

In another embodiment of a video content segment auction process, advertisers are presented with an advertisement request, which is passed to the analytics service for evaluation and ranking of video advertisements. In this embodiment, the advertiser has already established a bid scheme, and provided that scheme to the analytics service. The evaluation and selection of a video advertisement is executed on-the-fly, with the exception of bidding on-the-fly. Many other combinations of the process steps stated above are possible.

Figure 2A:
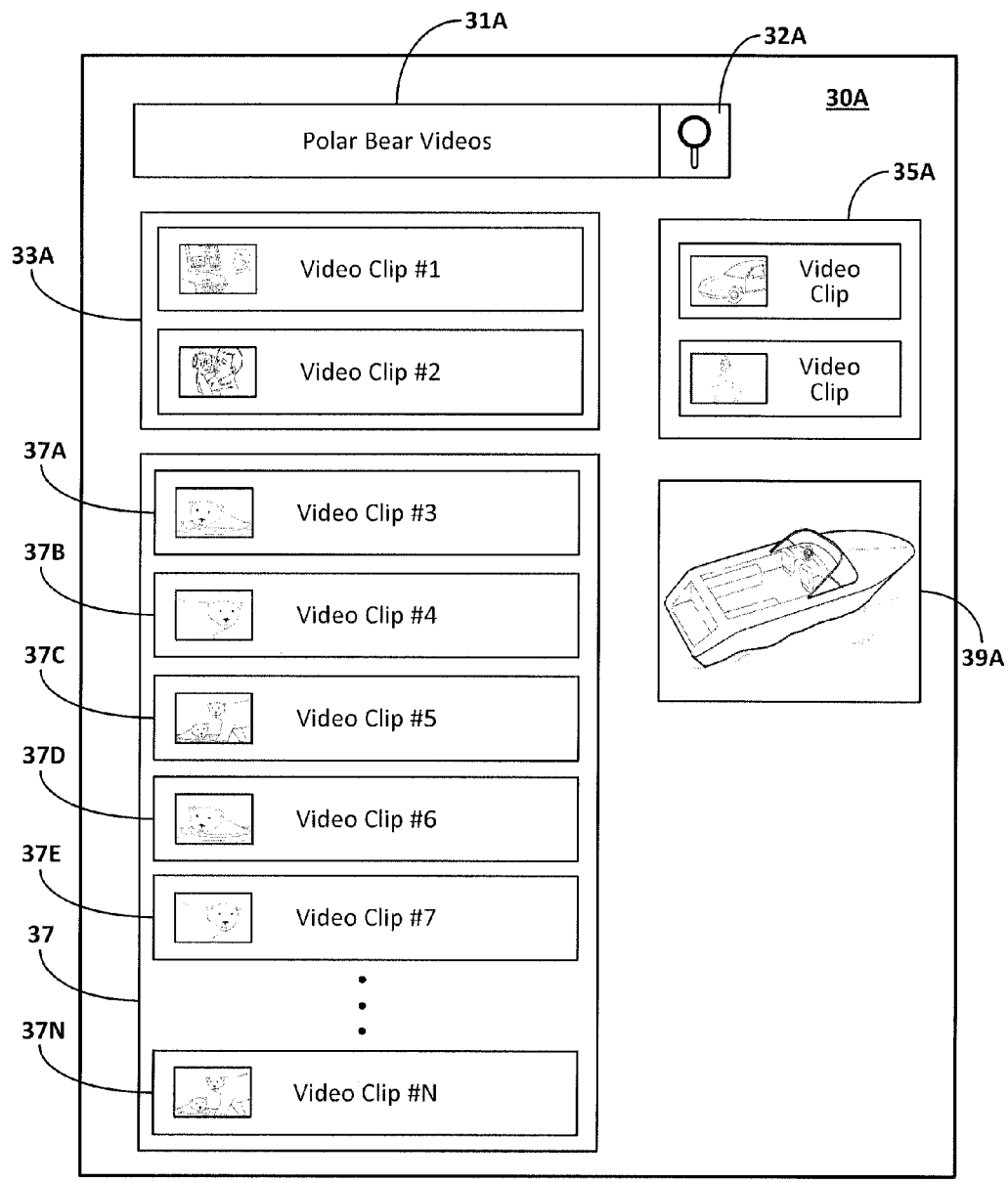
FIGS. 2A-2E illustrate example online resources at which are served video content segments.

In an embodiment, a Web site provides a video search feature in which a search engine may be used to search for video programs. A search query may include one or more keywords. The search engine uses the keywords to search one or more databases of video programs and returns the search results in a ranked order. The ranked order may be based on execution of a matching algorithm that compares the submitted search query to data related to the video programs. For example, a video program may be stored in a database of video programs along with a unique identification (ID) for the video program, a title of the video program, the length of the video program, data created by machine or human operator that characterizes the video program (e.g., the video program producer may label the video program as a comedy or a documentary; as a travel clip or a self-help clip; and as having mature content (R-rated) or for general audiences (PG-rated)). A machine may "view" the video program and extract keywords from audio, text, or scene recognition processes. All of this information, data, and metadata may be stored with, or referenced to the video program, and may be used by the search engine to identify video programs to provide with the search results. Thus, for example, a search query for polar bear video programs may return a number of video programs that star polar bears, and the video programs may be displayed on the search results Web page based on a qualitative/quantitative ranking of each of the polar bear video programs. An example of a search results Web page for polar bear video programs is shown in FIG. 2A.

Associated with the search results may be one or more advertisements. Some advertisements may be video advertisements. Some video advertisements may be embedded in the search results Web page. These video advertisements may be viewed directly by clicking on the video advertisement. Other video advertisements may be viewed when a Web site visitor clicks on the video advertisement and thereafter is directed to another (linked) Web site that displays the video advertisement. In this later example, the video advertisement as displayed on the search results Web page may show a thumbnail (e.g., a frame) of the promoted video program and one or more text objects. Once the Web site visitor's browser has navigated to the linked Web site, the actual promoted video program linked to the video advertisement plays in the Web site visitor's media device.

FIG. 1A is a simplified example of an environment that may improve the selection and serving of video content segments such as video advertisements at an online resource such as a Web page. In FIG. 1A, environment 1 includes content provider 2, advertiser 4, and clients 6, all of which communicate over network 5. Also included in environment 1 is advertising repository 8. The content provider 2 primarily provides content segments 3, the advertiser 4 primarily provides sponsored content 7, and the clients 6 primarily receive the content segments 3 and the sponsored content 7. In an embodiment, the advertiser 4 provides the sponsored content 7 to the content provider 2. The content provider 2 then includes the sponsored content 7 with the content segments 3. In another embodiment, the content provider provides the content segments 3, which include a link to the sponsored content 7, and the clients 6 then retrieve the sponsored content 7 from the advertiser 4 using the link.

The discussion that follows may refer to the sponsored content 7 as advertisements or ads; or, in the singular, as an advertisement or an ad. In an embodiment, the advertisements include video advertisements and static advertisements. However, the sponsored content 7 may include other advertisement forms. As noted, the advertiser 4 may provide the advertisements for presentation with the content segments 3, such as videos and embedded executables or software, provided by the content provider 2. The content provider 2 may provide a content segment 3 through the network 5 to one or more clients 6. The advertisements may be distributed through network 5 to one or more clients 6 before, during, or after presentation of the content segments 3. The advertiser 4 may be coupled to the advertising repository 8, and may retrieve therefrom advertisements to serve with the content segments 3. The clients 6 may be any media devices capable of displaying the content segments 3 and the sponsored content 7. In an embodiment, the sponsored content 7 includes promoted video programs, and a promoted video program may be linked to a video advertisement, which is served on a Web page such as a video program search results Web page.

In order to present the content segments 3 to a client 6 through the network 5, the content provider 2 may incorporate a Web server, and the content segments 3 then may be presented on Web pages written in the Hypertext Markup Language (HTML), or any language suitable for authoring Web pages. The content provider 2 may be an individual user, a Web publisher, or another entity capable of distributing content over the network 5. The content provider 2 may make the content segments 3 available using a specific address, or URL.

The content provider 2 may receive requests from the clients 6 for content segments 3. The content provider 2 may retrieve and then provide the requested content segments 3 in response to the request.

The content segments 3 may include various forms of electronic media. For example, a content segment 3 may include text, audio, video, advertisements, configuration parameters, documents, video files published on the Internet, television programs, audio podcasts, video podcasts, live or recorded talk shows, video voicemail, segments of a video conversation, and other distributable content. The content segments 3 may include sports, news, weather, entertainment, games, applications, or other content items. The content segments 3 may include content such as documents (e.g., Web pages, plain text documents, dynamic network applications provided to the user on-the-fly, Portable Document Format (PDF) documents, images), and video or audio clips. The content segments 3 may be graphic-intensive, media-rich data, such as, for example, FLASH-based content that presents video and audio or Asynchronous JavaScript and XML (AJAX) based Web applications or Web pages. The content segments 3 may include, for example, a live or recorded television program, a live or recorded theatrical or dramatic work, a music video, a televised event (e.g., a sports event, a political event, and a news event), and an animated feature.

In an embodiment, the advertiser 4, or another entity, may identify which sponsored content 7 (e.g., video advertisements and linked promoted video programs) should be served with the content segments 3 based on the subject matter of the content segments 3, metadata related to the content segments 3, information related to the clients 6, and the content and metadata related to the promoted video program. For example, the advertiser 4 may acquire information about the subject matter of a content segment 3, such as by reading content segment metadata that includes keywords describing the subject matter of the content segment 3, analyzing audio (e.g., speech) in the content segment 3, and analyzing the visual content of the content segment 3, for example. This content segment information may be obtained in real time or before a search engine executes a search. Alternately, the advertiser 4 may infer the content of a content segment 3 based on a submitted search query. The advertiser 4 or content provider 2 may obtain information about a client 6 such as, for example, that the client 6 is a smartphone. Finally, the advertiser 4 may obtain information related to the promoted video programs. The information may be used to identify relevant video advertisements from which one or more video advertisements are selected for presentation with the content segment 3.

A video content segment, referred to hereafter as a video program or a promoted video program, includes content that can be perceived visually when played, rendered, or decoded. A video program includes video data, and optionally audio data, executable code, hyperlinks, and metadata. Video data includes content that can be perceived visually when the video program is played, rendered, or decoded. Audio data includes content in the video program that can be perceived aurally when the video program is played, decoded, or rendered. Executable code includes, for example, interactive ADOBE FLASH, JavaScript, or other forms of interactive content. Hyperlinks include, for example, links embedded in or associated with the video program or executable code that provide an address link, such as a Uniform Resource Locator (URL), to other content or executable code.

A video program also may include many types of associated data, referred to hereafter as metadata. Metadata may include, for example, tags, labels, keywords, time stamps, XML-enclosed data, or other non-displayed information about the content. Metadata may include video data, audio data, closed-caption or subtitle data, a transcript, content descriptions (e.g., title, actor list, genre information, first performance or release date, etc.), related still images, user-supplied or provider-provided tags and ratings. Some metadata, such as a description, may refer to the entire video program, while other metadata (e.g., closed-caption data) may be temporally-based or time coded. Temporally-based data may be used to detect scene or content changes to determine relevant portions of that data for selecting advertisements.

Video programs may be described by several physical characteristics. A video program has a defined length in units of time. A video program will have a specific contrast that is measurable by electronic devices. A video program may incorporate audio data. The audio data may vary in terms of loudness when the video program is played at a client 6.

The content provider 2 may provide video programs for presentation at a client 6. The video programs may be presented as a stream or as a downloadable file to a client 6. The content provider 2 also may provide a video player module with the video program. In an embodiment, the content provider 2 provides a video program and a video player is embedded in a Web page. The Web page may include the video player and a reference to the video program. The Web page may be sent to the client 6. At the client 6, the embedded video player may retrieve the referenced video program for playback.

In an embodiment, a resource such as a Web page and a video program embedded in the resource are provided by different content providers. For example, a first content provider may embed (or provide) in a second Web page provided by a second content provider a link to a video at a first Web page. The link is a location (e.g., a URL) of the first Web page. When the second Web page is rendered at the client 6, the video may be obtained from the second content provider by activating the link.

Some video advertisements, as a form of sponsored content 7, may have many or all of the characteristics of a video program. Accordingly, a video advertisement may be described by the same physical characteristics used to describe a video program. Other video advertisements, as noted above, may contain a thumbnail image, lines of text, and a link to a video program (e.g., a promoted video program). The description that follows focuses on these later forms of video advertisement.

The content provider 2 may transmit information to the advertiser 4 about how, when, and/or where the video advertisements are to be rendered, and/or information about the results of that rendering such as where the video advertisement appears on a Web page, for example. The content provider 2 also may specify a desired length of a promoted video program associated with a video advertisement. The content provider 2 further may limit a cumulative length of promoted video programs that may be displayed on a Web page. The content provider 2 may impose additional limitations on the physical characteristics of a promoted video program. Finally, the content provider 2 may impose limitations on the content of the promoted video program (e.g., no political promoted video programs).

As noted above, video programs and video advertisements may be served on a resource such as a Web page when that Web page is loaded and rendered at a media device such as a lap top computer (i.e., at a client 6). The computer typically has installed thereon a browser, which is a software program that allows the computer to connect to and acquire content (i.e. Web pages) from a Web server. A Web page may display static images, including text, and moving images, including videos and animations. Video programs displayed by way of a Web page may be short, on the order of seconds, to long, such as for a full-length feature film.

The video programs may be provided on a search results Web page. A Web site visitor submits a search query, for example, "movie trailers 2012" (see, e.g., FIG. 3A), to a search engine, and the search engine returns a number of movie trailers on the search results Web page. When the search results Web page is rendered at the Web site visitor's media device, the displayed movie trailers may be represented by a static image; for example, a first frame or thumbnail of the movie trailer. The Web site visitor then clicks on one of the movie trailers, and the video program begins. In some examples, only the first portion of the movie trailer is buffered in the Web site visitor's media device, and the remaining portions then are streamed to the media device. The search results Web page also may display a number of advertisements. The advertisements may be static (e.g., a banner ad) or video advertisements including video advertisements with linked promoted video programs.

Video advertisements may be included in a separate section of the Web page or may be included with a specific video program. For example, a sports video clip may play, but may be preceded by a video advertisement. Some video advertisements auto play, some may auto play, but may be stopped and discarded or skipped after a set time, such as five (5) seconds, and some may require the Web site visitor to click on the video advertisement to initiate play. As noted above, some video advertisements that accompany a video program may play before the video program plays; these may be called pre-roll video advertisements. Other video advertisements play periodically during the course of playing the video programs; in this respect, the video advertisements are akin to commercials shown in broadcast television. Other video advertisements may play at the end of the video program. Some auto play video advertisements begin play when the Web page loads and is rendered. Some video advertisements only play when the Web site visitor clicks on the video advertisement.

Video advertisements that link to a promoted video program may be displayed in a separate section of the Web page. FIGS. 2A-4B illustrate examples of this arrangement on Web pages.

Companies providing video advertisements may prefer to pay only for those video advertisements that actually are watched. Thus, when a video advertisement is served on a Web page, but does not play, or has its play stopped by action of the Web site visitor, a company may prefer not to be charged. That is, a company may prefer an advertising basis that is more akin to the CPC basis typically used for static advertisements. Correspondingly, a Web site publisher may want to increase revenue by serving video advertisements that are more likely to actually play. Accordingly, both the company and the Web site publisher may want a mechanism to select video advertisements that have a high probability of being played; for example, video advertisements that have a high interestingness or quality factor, as described below. The herein disclosed systems and methods address these concerns of companies and Web site publishers, and thus provide distinct advantages over current advertisement auction systems.

The discussion that follows focuses on video advertisements as presented on Internet Web pages. However, similar concepts apply equally to other forms of online content delivered at other types of online resources. For example, the systems and methods apply to video advertisements served with applications executing on mobile media devices such as tablets and smartphones; video games played on a dedicated fixed or mobile game player, or on a lap top computer, tablet, or smartphone; and other online content and online resources.

In one aspect, the herein disclosed systems and the methods enabled thereby may consider content derived from the linked promoted video program and metadata associated with the promoted video program.

In another aspect, the systems and method may consider the "performance" of the promoted video program, including the number of unique views and information derived from comments about the promoted video programs such as a "thumbs up/thumbs down" ("like/dislike") rating, keywords in the comments, number of comments, and click through actions by Web site visitors during or after viewing the promoted video program (e.g., buying movie tickets online, purchasing a DVD of the promoted video program). The performance of the promoted video program also may include programs watched data such as for example: "video watch rate", "video completion rate", "video stopped in the middle", "actions performed after the video", and "video watched multiple times by the same individual". All of these metrics may be used to determine a promoted video program quality factor (QF), which then may be used to rank video advertisements according to a RANK algorithm, described below. Using this quality factor to designate or select a video advertisement to be served on a particular Web page may increase the chances that a Web site visitor actually will watch the promoted video program.

In yet another aspect, the systems and the methods enabled thereby may use information about how a Web site visitor has interacted with a video program. The interaction information also may be gathered by an analytics service or other third party. This interaction information may be used to provide insight into how interesting a video program is. The interaction information may be derived from a number of metrics, including, for example: "video watch rate", "video completion rate", "video stopped in the middle", "actions performed after the video", "indicated likes/dislikes," and "video watched multiple times by the same individual".

In still another aspect, the systems and the methods enabled thereby may consider certain physical characteristics of the promoted video programs when determining which video advertisements to serve on a particular Web page. As used herein, a physical characteristic of a promoted video program may be directly and objectively-measurable by a non-human (e.g., electronic) measurement device and does not rely on evaluation by a human to determine its value. For example, the length of a promoted video program may be determined by operation of a clock. While a human may operate the clock (e.g., start a stop watch), the human does not directly measure time; rather, the clock measures time. Other examples of physical characteristics include audio levels measured by an audio meter, and sharpness, color, and contrast, measured by a suitably programmed image processor. In contrast to these physical characteristics, the subject matter of a promoted video program may be determined by subjective evaluation by a human. For example, a human may express the subject matter in terms of genre and other non-objective criteria.

One physical characteristic of a promoted video program is its length. However, the length of a promoted video program may be more or less significant depending on the type of media device displaying the video advertisement. For example, a Web site visitor watching a promoted video program on an Internet-enabled television (iTV) may be more willing to sit through the entire promoted video program than he would if viewing the promoted video program on a smartphone. Furthermore, video advertisements for mobile applications tend to refresh after a specified time. In addition, watching promoted video programs that are too long, whether on a fixed media device or a mobile media device, may cause fatigue to the Web site visitor, or loss of interest. After all, the Web site visitor's primary purpose in accessing a Web site likely is not to view advertisements, but rather to view other content that is the subject of that Web site (e.g., the video program search results). Still further, when a video advertisement plays, the Web site visitor may be directed to another (i.e., a second) Web site and all other Web page activity at the original Web page (i.e., the search results Web page) stops. If the Web site visitor only has X amount of time to devote to viewing a Web page and ½ X is taken up with a video advertisement, the Web site visitor may become annoyed and move away from the second Web site, and as a consequence, no revenue may be generated as a result of the visit to the second Web site. Thus, shorter video advertisements may be more effective for mobile media devices, while longer video advertisements may be acceptable for fixed media devices.

As a consequence of video advertisement length effect on Web page viewing metrics, the herein disclosed systems and methods may take promoted video program length into account when selecting a video advertisement to serve with a Web page. For example, in an auction system, if two video advertisements have the same value for a maximum bid, the shorter promoted video program may be selected since the Web site visitor then may return to his original viewing experience on the search results Web page and, moreover, may be able to view additional video advertisements and promoted video programs.

Another physical characteristic that may be measured, evaluated, and used in selecting a video advertisement to serve on a Web page is the type and level of audio (if any) that accompanies the promoted video program. For example, a "noisy" promoted video program may annoy a Web site visitor, who then may mute the program, stop its play, if possible, or just elect to watch fewer promoted video programs.

Still another physical characteristic that may be measured, evaluated, and used in selecting a promoted video program to serve on a Web page is the sharpness of the video. Videos that are sharp are more pleasing to the eye and may convey their intended message more effectively. Sharpness is a characteristic that may be measured electronically.

In still another aspect, the herein disclosed systems and methods, in evaluating and selecting a video advertisement, may take into account the specific type, make, and/or model of media device on which the Web page will be rendered and the promoted video program displayed. For example, the systems may detect that a media device is a smartphone as opposed to a tablet or an iTV. Some promoted video programs may not be effective when displayed on a smartphone. Some promoted video programs, because of their length, contrast, or audio may best be displayed on a fixed media device such as an iTV in an indoor setting. Thus, an advertiser, Web site operator, or video program provider may prefer not to have certain promoted video programs served on a Web page rendered on a roaming smartphone.

The methods executed by the herein disclosed systems may involve use of information that in some respect identifies a device the Web site visitor uses to access the video programs. For example, when a Web site visitor uses an Internet browser to access a Web site, a Web server may create a random identification (ID) that identifies the browser and may cause the random ID to be stored on the Web site visitor's device.

In situations in which the systems disclosed herein collect personal information about Web site visitors, or may make use of personal information, the Web site visitors may be provided with an opportunity to control whether programs or features collect Web site visitor information (e.g., information about a Web site visitor's social network, social actions or activities, profession, a Web site visitor's preferences, or a Web site visitor's current location), or to control whether and/or how to receive advertisements from an ad server that may be more relevant or of interest to the Web site visitor. In addition, certain data may be treated in one or more ways before it is stored or used, so that personally identifiable information is removed. For example, a Web site visitor's identity may be treated so that no personally identifiable information can be determined for the Web site visitor, or a Web site visitor's geographic location may be generalized where location information is obtained (such as to a city, ZIP code, or state level), so that a particular location of a Web site visitor cannot be determined. Thus, the Web site visitor controls how information is collected about the Web site visitor and used by a server.

Figure 1B:
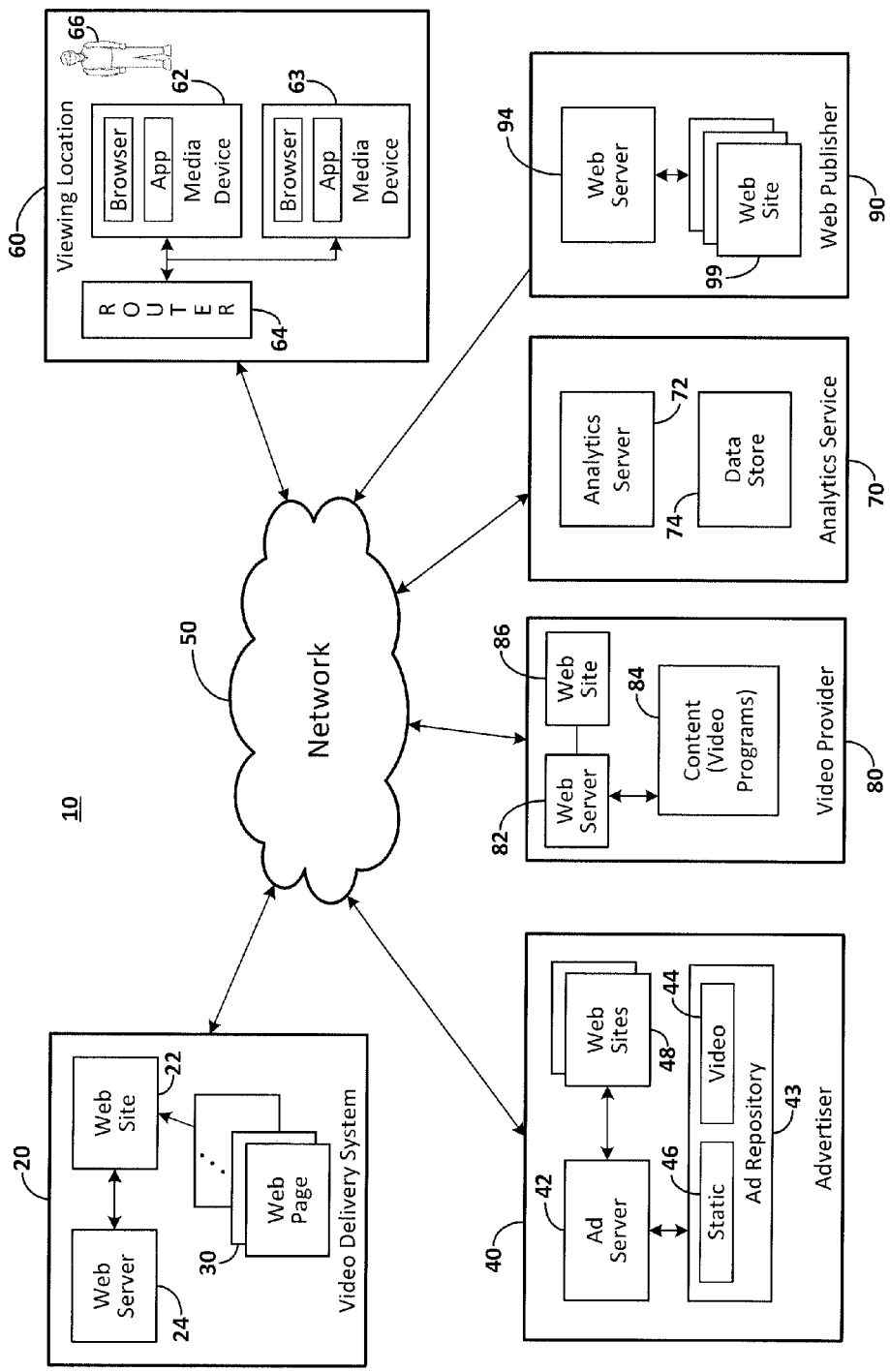

FIG. 1B illustrates a more detailed view of an environment similar to that of FIG. 1A, and in particular illustrates aspects of an environment that supports improved selection and serving of video advertisements implemented for a video delivery system. In FIG. 1B, environment 10 includes video delivery system 20, advertiser 40, viewing location 60, analytics service 70, video provider 80, and Web site publisher 90, all of which communicate over network 50. Although FIG. 1B shows these entities as separate and apart, at least some of the entities may be combined or related. For example, the video delivery system 20 and analytics service 70 may be part of a single entity. Other combinations of entities are possible.

The video delivery system 20 operates Web site 22. The Web site 22 is hosted on Web server 24. The Web site 22 includes Web pages 30. The Web site 22 may include Internet search features that allow Web site visitors 66 to search for video programs and other content displayed by the Web server 24 on the Web pages 30. The Web pages 30 may display search results, namely content segments such as video programs, as well as video advertisements, static advertisements, and other information. Some advertisements may provide links to other Web pages where video advertisements and promoted video programs are displayed. The Web server 24 may provide links to enable navigation among the Web pages 30. The Web site 22 may display video advertisements created and provided by advertiser 40, and video programs created by Web site visitor 66, video provider 80, and other entities. The Web server 24 may incorporate components of a video advertisement selection system that improves serving of video advertisements on the Web pages 30. Example components of the video advertisement selection system are described with respect to FIG. 5. As an alternative to implementation on the Web server 24, at least some components of the video advertisement selection system may be implemented at another back-end server such as at the analytics service 70.

The Web pages 30 may display search results in response to a search query submitted by Web site visitor 66. For example, a Web page 30 may display several video programs that satisfy a search query. Each such video program may be assigned a unique identification (ID). The Web pages 30 also may display one or more static or video advertisements. The Web site visitor 66 may be more interested in the displayed advertisements when the displayed advertisements have some relationship to the content of the video programs appearing on the Web page 30. In the context of a promoted video program, one aspect of selecting a video advertisement may be to match content and associated data, information, and metadata derived from the promoted video program with keywords that relate to the content of the video programs appearing on the Web page 30. That is, serving of video advertisements on a video Web page 30 may be improved when the video advertisements are served based on the content of the linked promoted video programs relative to the video programs appearing on the Web page 30. For example, promoted video programs for polar bear tours in Churchill, Manitoba may be more appropriate when served with search result video programs about Arctic life than for search result video programs about the Amazon.

The advertiser 40 operates ad server 42 to provide video advertisements 44 and static advertisements 46 that are served at the Web pages 30, and that may be stored in ad repository 43. A video advertisement 44 may link to a promoted video program, which also may be stored in the ad repository 43 along with a promoted video program ID and associated data, metadata and information. In an embodiment, the ad repository 43 stores only current promoted video programs. The advertiser 40 may be or may represent a single company or entity, a group of related companies, or a group of unrelated companies (e.g., the advertiser 40 may operate as an ad broker). In an embodiment, the advertiser 40 may operate an online advertising network. In an embodiment, the advertiser 40 and the video delivery system 20 are part of the same entity. The advertiser 40 may operate the ad server 42 to provide one or more Web sites 48. The video advertisements 44 may include audio, video, and animation features. The video advertisements 44 may be in a rich media format. In one aspect, the video advertisements 44 are linked to promoted video programs displayed at the Web sites 48.

The video advertisements 44 may include links to other Web pages and other Web sites, including Web sites 48. For example, a video advertisement 44 for a car may be represented on Web page 30 as a thumbnail image, text, and a link to a car manufacturer's Web site. A Web site visitor 66 viewing the thumbnail image at the Web page 30 may "click" on the advertisement 44 and be redirected to the car manufacturer's Web site 48 where a promoted video program of the manufacturer's car is played.

The network 50 may be any communications network that allows the transmission of signals, media, messages, voice, and data among the entities shown in FIG. 1B, including radio, linear broadcast (over-the-air, cable, and satellite) television, on-demand channels, over-the-top media, including streaming video, movies, video clips, and games, and text, email, and still images, and transmission of signals, media, messages, voice, and data from a media device to another media device, computer, or server. The network 50 includes the Internet, cellular systems, and other current and future mechanisms for transmission of these and other media. The network 50 may be both wired and wireless. The network 50 may be all or a portion of an enterprise or secured network. In an example, the network 50 may be a virtual private network (VPN) between the video delivery system 20 and a media device at the viewing location 60 across a wire line or a wireless link. While illustrated as a single or continuous network, the network 50 may be divided logically into various sub-nets or virtual networks, so long as at least a portion of the network 50 may facilitate communications among the entities of FIG. 1B.

The viewing location 60 may be the residence of an individual, such as Web site visitor 66, who operates media devices 62 and 63 to access, through router 64, resources such as the Web sites 22. The viewing location 60 may be a mobile location that changes with time as, for example, when the Web site visitor 66 changes his location. The media devices 62 and 63 may be fixed or mobile. For example, media device 62 may be an Internet connected "smart" television (iTV); a "basic" or "smart" television connected to a set top box (STB) or other Internet-enabled device; a Blu-ray™ player; a game box; and a radio, for example. Media device 63 may be a tablet, a smartphone, a lap top computer, or a desk top computer, for example. The media devices 62 and 63 may include browsers, such as browser 100. The browser 100 may be a software application for retrieving, presenting, and traversing resources such as at the Web site 22. A resource may be identified by a Uniform Resource Locator (URL) and may be a Web page, image, video, or other content. The URL may allow the browser 100 to connect to the Web site 22. Hyperlinks present in resources enable the Web site visitor 66 to navigate the browser 100 to related resources. The Web site visitor 66 may operate the browser 100 to search for Web sites related to specific topics or to search for a specific Web site by URL. The media devices 62 and 63 also may include applications 110. The Web site visitor 66 may cause the media devices 62 or 63 to execute an application 110, such as a mobile banking application, to access online banking services. The application 110 may involve use of a browser or other means, including cellular means, to connect to the online banking services. Other applications may include game applications. The game applications may include provisions for serving video advertisements during the play of the game. Once connected to the Web site 22, the media devices 62 and 63 may allow viewing of content such as video programs and static images generated by entities such as the video provider 80 and displayed on the Web pages 30 at the Web site 22. The video programs and static images may include slots or spaces into which content segments such as advertisements may be placed. When such a video program or static image is to be viewed on the media devices 62 or 63, the Web server 24 may send an advertisement (ad) request, which is received at the advertiser 40, and which may be answered with a video advertisement 44 and a static advertisement 46.

The Web site visitor 66 may access the Web site publisher 90 to use a social networking Web site, a blog Web site, including a personal blog Web site and/or a commercial blog Web site, and other Web sites.

The Web site visitor 66 may operate the media devices 62 and 63 to communicate through the network 50 directly to the analytics service 70. For example, an application on the media device 62 may be a game. The individual game moves (clicks) made by the Web site visitor 66 in playing the game may be sent directly to the analytics service 70 by the media device 62. For example, when paying a video word game (i.e., application 110), the Web site visitor may type in a word based on a set of available letters and "hit" an "enter" button. In response, the application 110 may send an ad request to the ad server 42. The ad server 42 may respond by sending a video advertisement to the media device 62. If the Web site visitor 66 elects to view the video advertisement, the browser 100 in the media device 62 may send an advertisement played signal directly to the analytics service 70. Alternately, the advertisement played signal may be sent to the ad server 42, and the ad server 42 sends a corresponding signal to the analytics service 70.

The analytics service 70 includes analytics server 72. The analytics service 70 may operate in conjunction with Web site operators to collect, analyze, and report information and data related to visits to Web sites and viewing of video advertisements by Web site visitors 66. The analytics service 70 may be part of the video delivery system 20, or the advertiser 40, or may be a separate entity. The analytics service 70 collects, analyzes, stores (in data store 74), and reports on data and information related to visits to the Web site 22, operation of applications, and other reported activity. In an embodiment, as is described with respect to FIG. 5, the analytics service 70 may operate system 500 to collect promoted video program information, video advertisements watched information, and other information that may be used to improve serving of video advertisements in the video delivery system 20 or at a Web site operated by Web site publisher 90.

In an embodiment, given the potentially large number of promoted video programs, video programs, search engines, and Web pages, the analytics service 70, and particularly the analytics server 72 and its associated data sore 74 may be replicated such the analytics service 70 includes hundreds or thousands of such server-data store combinations in a distributed architecture that makes the analytics service 70 responsive to a very large number of video program search requests per unit time.

The video provider 80 provides content, in the form of video programs 84, which may be displayed on the Web pages 30 and viewed and/or heard by the Web site visitor 66 using the media devices 62 and 63. In an embodiment, the video provider operates, using Web server 82, video sharing Web site 86, and may embed the videos 84 on the Web site 86. However, the video program provider may simply create and provide video programs, such as polar bear video programs, for display by other entities such as the video delivery system 20 or at a Web site operated by Web site publisher 90. The video provider 80 may be a company, a movie or television studio, or an individual.

The Web site publisher 90 operates Web sites 99 using Web server 94. The Web sites 99 may include those on which Web site visitors 66 may provide comments, upload videos, and upload images. The Web sites 99 may include social networking Web sites. The Web site publisher 90 may operate a Web hosting service, and the Web sites 99 may be personalized for and used by individuals, such as the Web site visitors 66.

FIGS. 2A-2E illustrate examples of Web pages on which video programs may be displayed and on which may be served video advertisements or links to video advertisements.

FIG. 2A illustrates an example Web page displaying results of a search query for polar bear video programs. In FIG. 2A, Web page 30A includes search query window 31A in which Web site visitor 66 has entered a search query for polar bears. The Web site visitor 66 initiates the search by pressing search button 32A, which has a magnifying glass icon. A search engine returns polar bear video programs 37A-N in video program area 37. The Web site visitor 66 may select a video program 37n to begin play by clicking on the video program thumbnail. The video program then will load from the video delivery system 20 and begin play. However, the video program may load in groups of frames (i.e., the video program sections are buffered in the browser 100).

The Web page 30A shows three advertisement areas. Advertisement area 33A is displayed at the top of the Web page 30A above the video programs 37n, and includes two video advertisements. Advertisement area 35A also is at the top of the Web page 30A and also includes two video advertisements. Advertisement area 39A provides a static advertisement.

The advertisements represented in the areas 33A, 35A and 39A all may include links to other Web sites and other Web pages, and when the Web site visitor 66 clicks on any of these advertisements, the Web site visitor's browser 100 is directed to the appropriate linked Web page where the advertisement (video or static) is displayed.

Figure 2B:
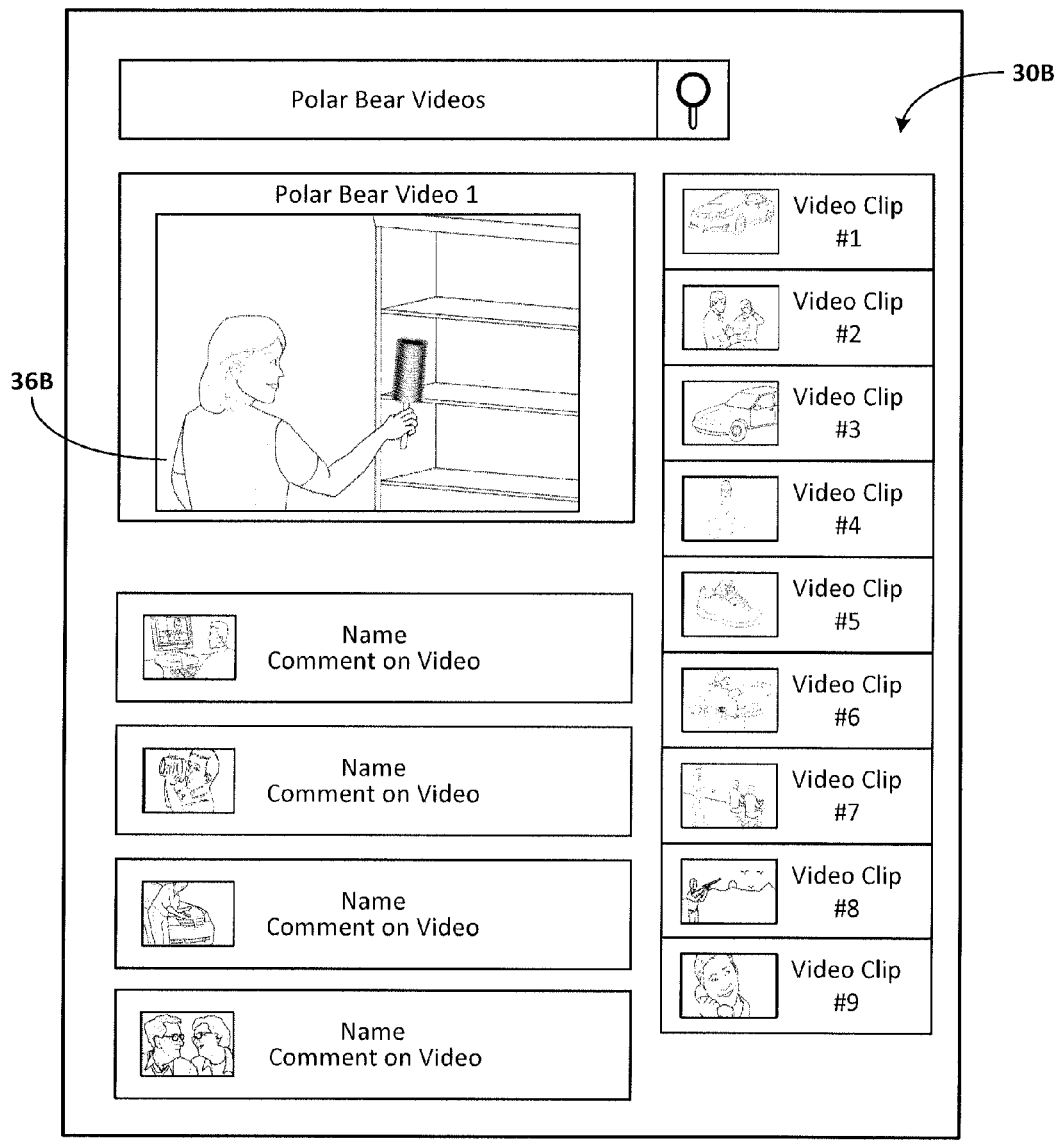

FIG. 2B illustrates Web page 30B, which is displayed in the browser 100 as a result of the Web site visitor 66 clicking on the first polar bear video program 37A. However, rather than immediately playing the polar bear video program 37A, the browser 100 plays video advertisement 36B for a duster. In an alternative, the advertisement 36B plays to completion (e.g., 20 seconds) before the polar bear video program begins play. In another alternative, the Web site visitor 66 is able to skip all or part of the advertisement 36B.

Figure 2C:
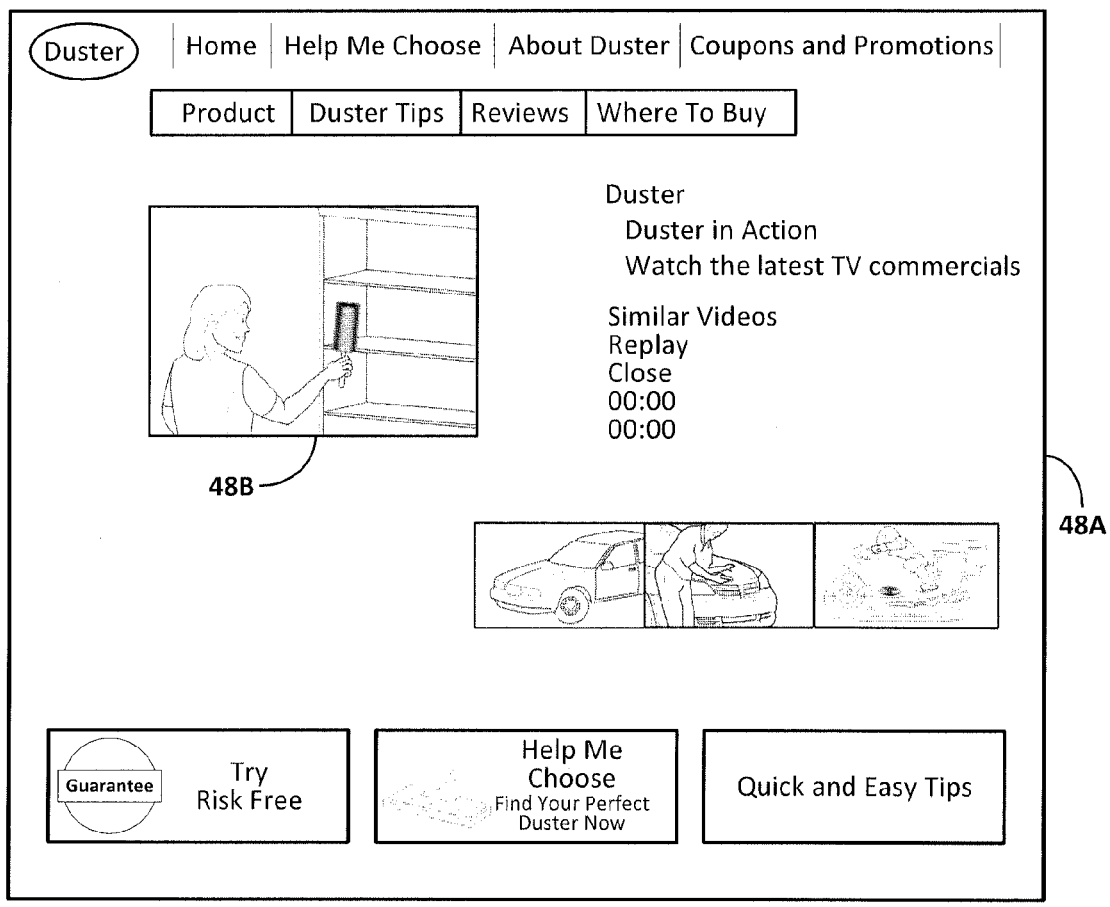

FIG. 2C illustrates an example Web page to which the Web site visitor 66 is directed upon clicking on the advertisement 36B of FIG. 2B. In FIG. 2C, Web page 48A displays a further video 48B for the same duster product, and in addition displays links to other Web pages providing product information, offers, product reviews, related products, and store locations.

Figure 2D:
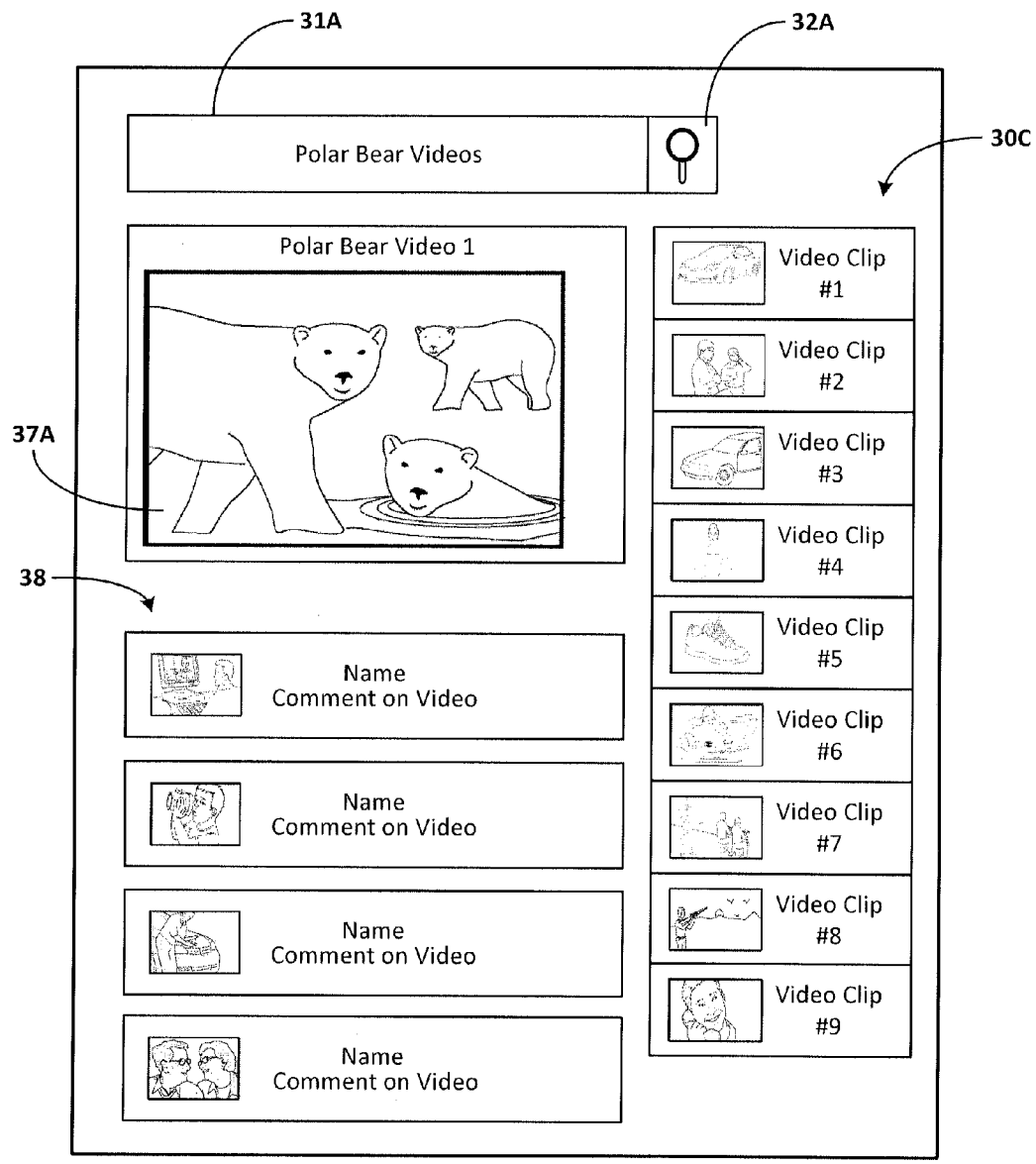

FIG. 2D illustrates example Web page 30C showing polar bear video 37A in mid-play. As can be seen, in addition to the polar bear video, Web page 30C also includes a comments section 38 in which Web site visitors 66 may comment on the video 37A, other videos, or other subjects.

Figure 2E:
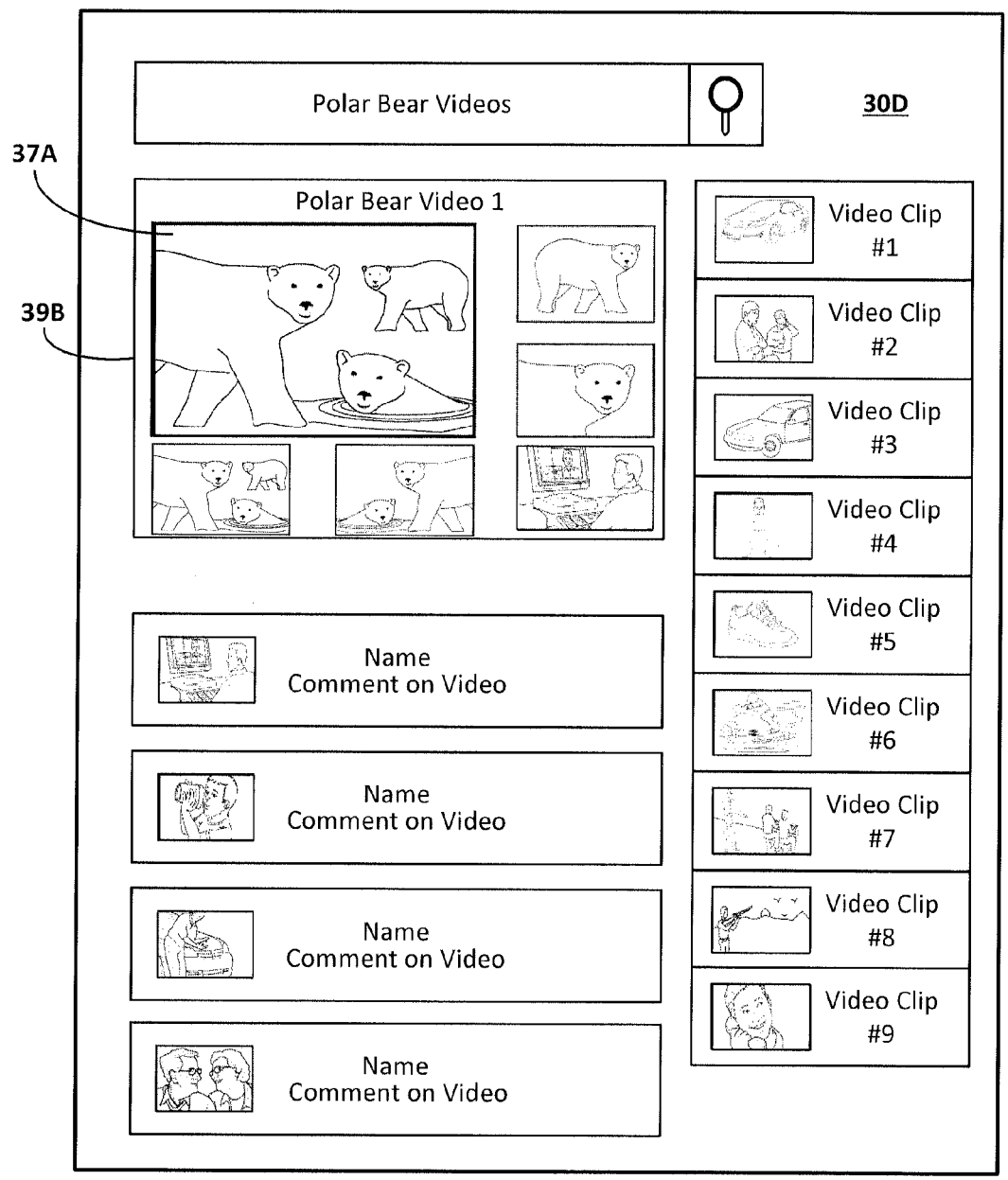

FIG. 2E illustrates example web page 30D, which includes video viewing area 39B. Viewing area 39B shows a thumbnail of the featured polar bear video 37A, and thumbnails of other polar bear videos as well as other videos.

Figure 3A:
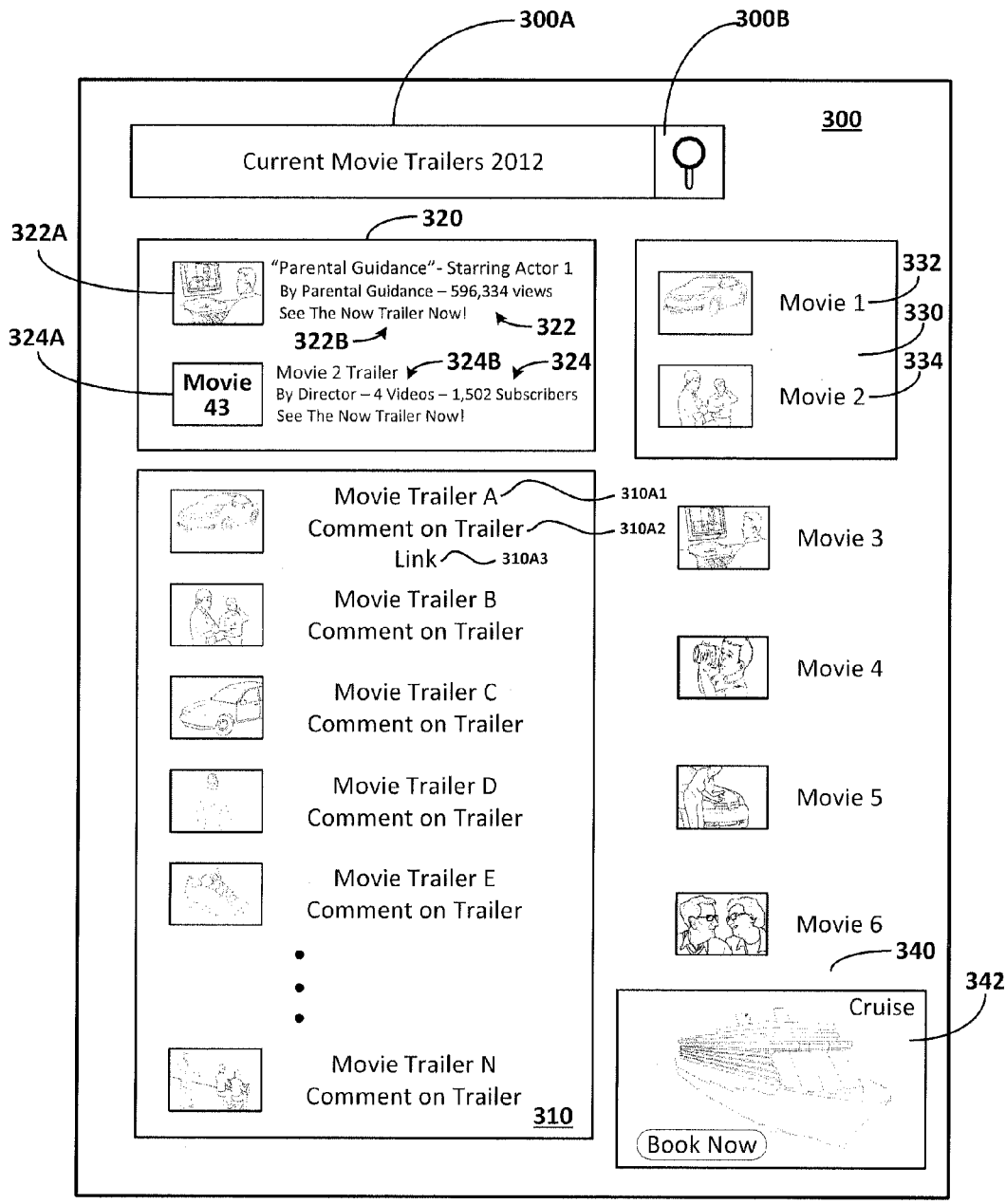
FIGS. 3A and 3B illustrate further example online resources at which are served video content segments.
Figure 3B:
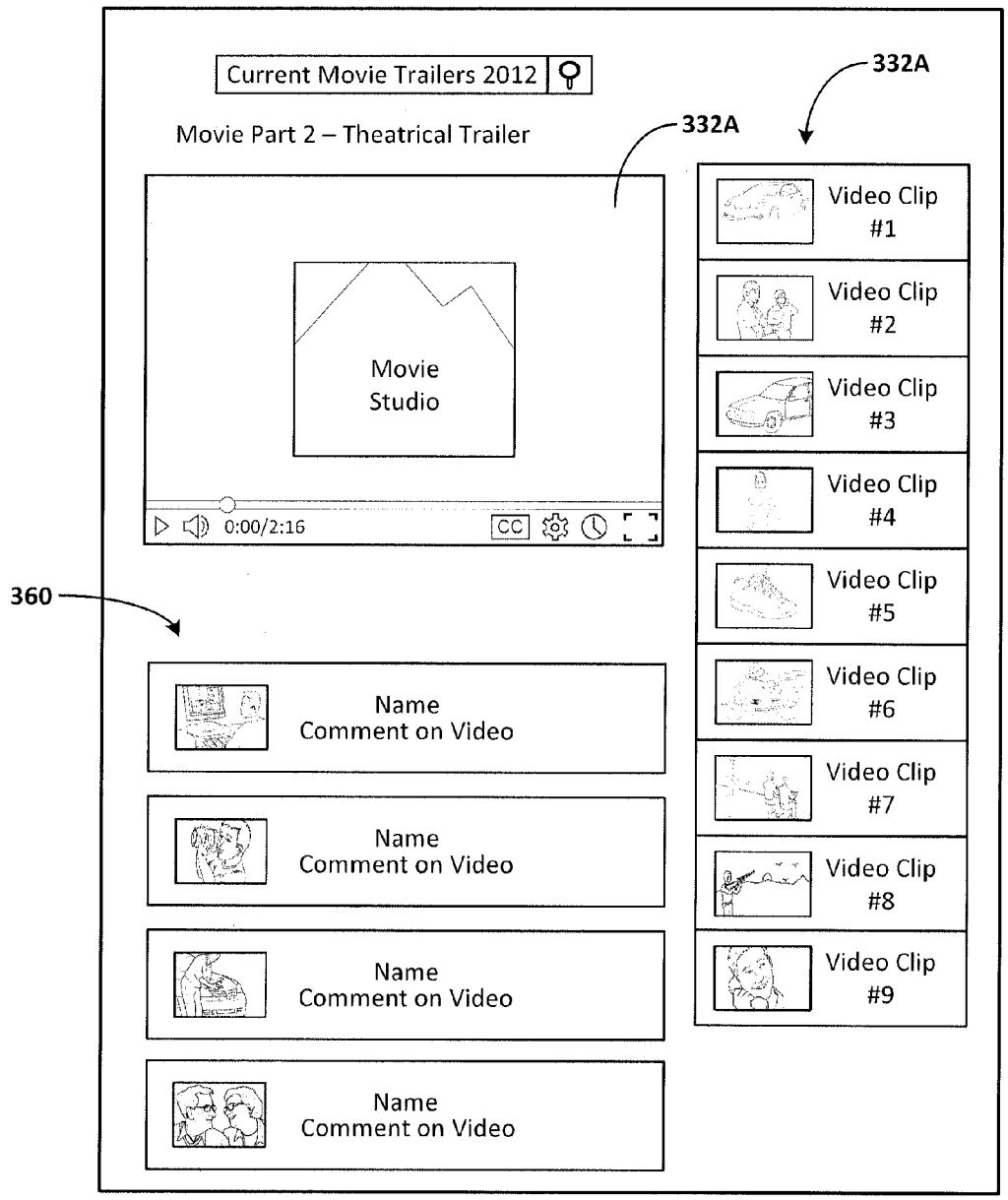

FIGS. 3A and 3B illustrate further example online resources at which are served video content segments.

FIG. 3A illustrates an example search results Web page on which are displayed search results for a query for movie trailers. In FIG. 3A, Web page 300 includes search query window 300A in which a Web site visitor 66 may enter a search query. In the example of FIG. 3A, the visitor 66 has entered "current movie trailers 2012" as the search query. Search button 300B, which shows a magnifying glass icon, is used to initiate execution of the search. The Web page 300 includes search results area 310 in which are displayed, as search results, movie trailers 310A-310N. Each movie trailer includes additional data, or metadata, such as a title 310x1 (x is a variable A-N), number of views 310x2, and a link 310x3.

Activating the link 310x3 may cause the browser 100 to navigate away from the Web page 30B to another Web page connected to the link.

The example Web page 300 includes three ad sections. A first ad section 320, which is displayed at a prominent (i.e., top) part of the Web page 300, includes two video advertisements. The two video advertisements illustrated also are for movie trailers, specifically for promoted video programs, although other video advertisement types may be displayed in the ad section 320. The video advertisements include a thumbnail image and associated metadata. Thus, movie trailer 322 and its associated thumbnail 322A and metadata 322B is a first video advertisement, and movie trailer 324 and its thumbnail 324A and metadata 324B is a second video advertisement. The metadata associated with these advertisements may include a movie title, the current number of views, and a link, "See Trailer Now". In another embodiment, the metadata may provide a link to see further information including additional trailers for the movies. Finally, a video advertisement may include a link that, when clicked on by the Web site visitor 66, will cause the browser 100 to navigate to a Web page that displays the movie trailer.

A second ad section 330 includes additional video advertisements, also for promoted video programs, including video advertisements 332 and 334. The video advertisements 332 and 334 have features similar to those of the video advertisements in the first ad section 320.

Finally, ad section 340 displays static advertisement 342. The static advertisement 342 includes a link (Book Now) to a separate Web page (e.g., such as Web page 48) for the advertised product.

FIG. 3B illustrates Web page 350, which displays a promoted video program 332A associated with video advertisement 332 of FIG. 3A. Also included on Web page 350 is a comments/blog section 360 in which Web site visitors 66 may post comments about the promoted video program 332A, rate the promoted video program 332A, discuss the movie associated with the promoted video program 332A, and provide comments in response to comments of other Web site visitors 66.

Figure 4A:
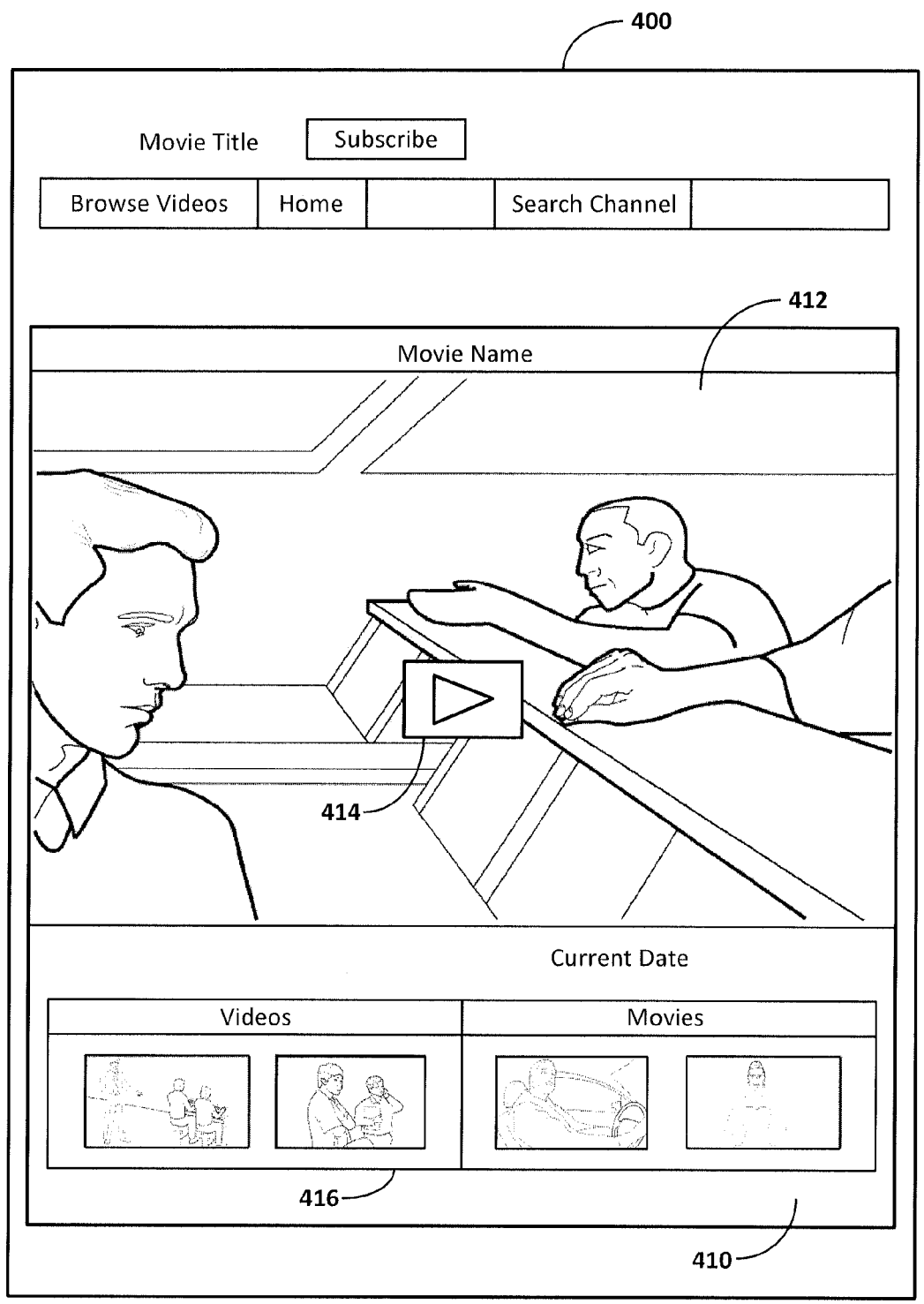
FIGS. 4A and 4B illustrate still further example online resources at which are served video content segments.
Figure 4B:
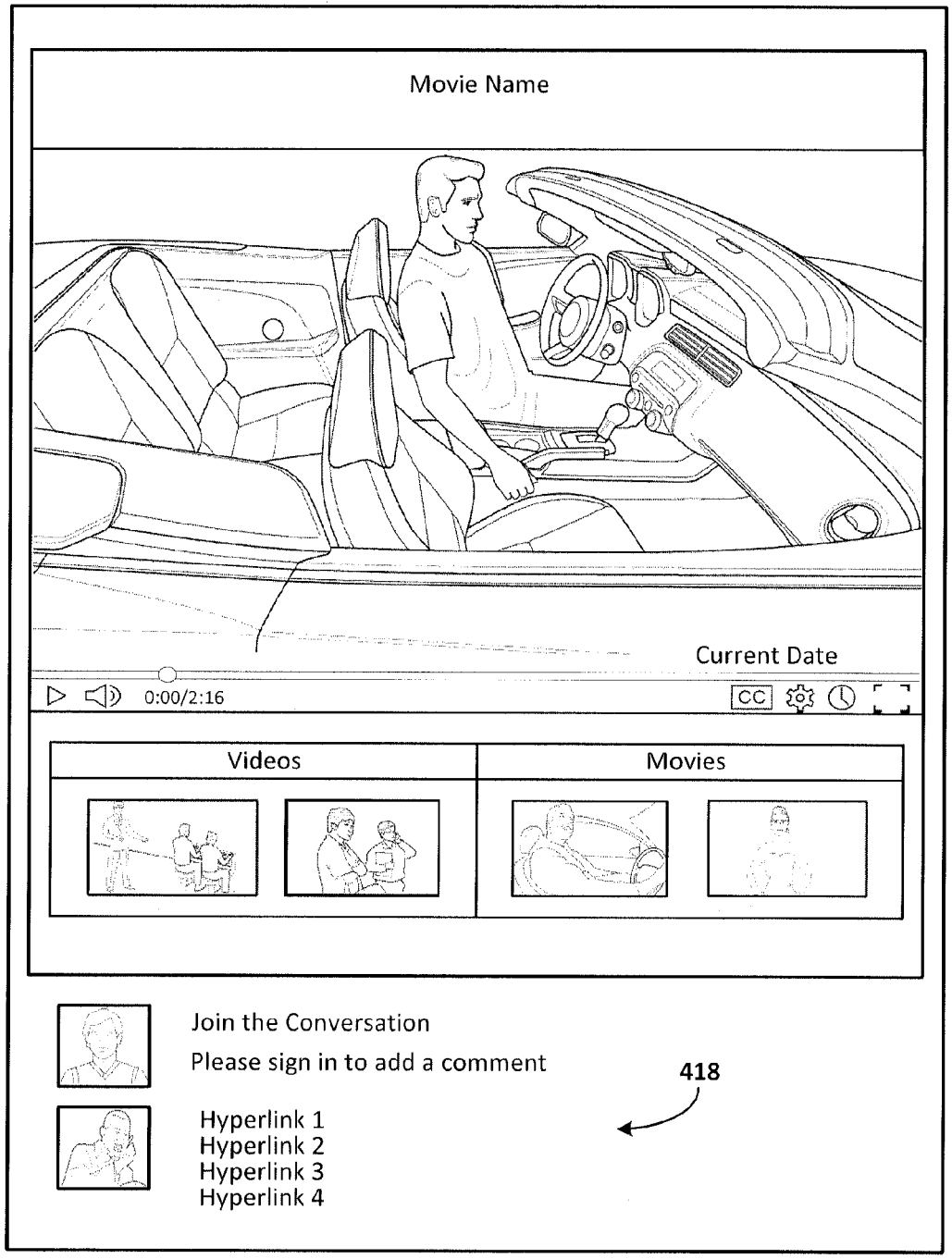

FIGS. 4A and 4B are still further example online resources at which are served video content segments.

FIG. 4A illustrates Web site 400, which is a Web site for one of the movie trailers shown in ad section 320 of FIG. 3A, and Web page 410, displayed at the Web site 400. The Web page 410 displays thumbnail image 412, which is a first frame of the movie trailer, start/pause button 414, which is used to start and pause the movie trailer, and related information section 416, which may show stills from the movie and other information.

FIG. 4B illustrates Web page 410 after the play button 414 has been pressed and the movie trailer begins playing. As can be seen, the Web page 410 includes comment section 418 in which other Web site visitors may post comments about the trailer, the movie itself, and other matters.

Figure 5:
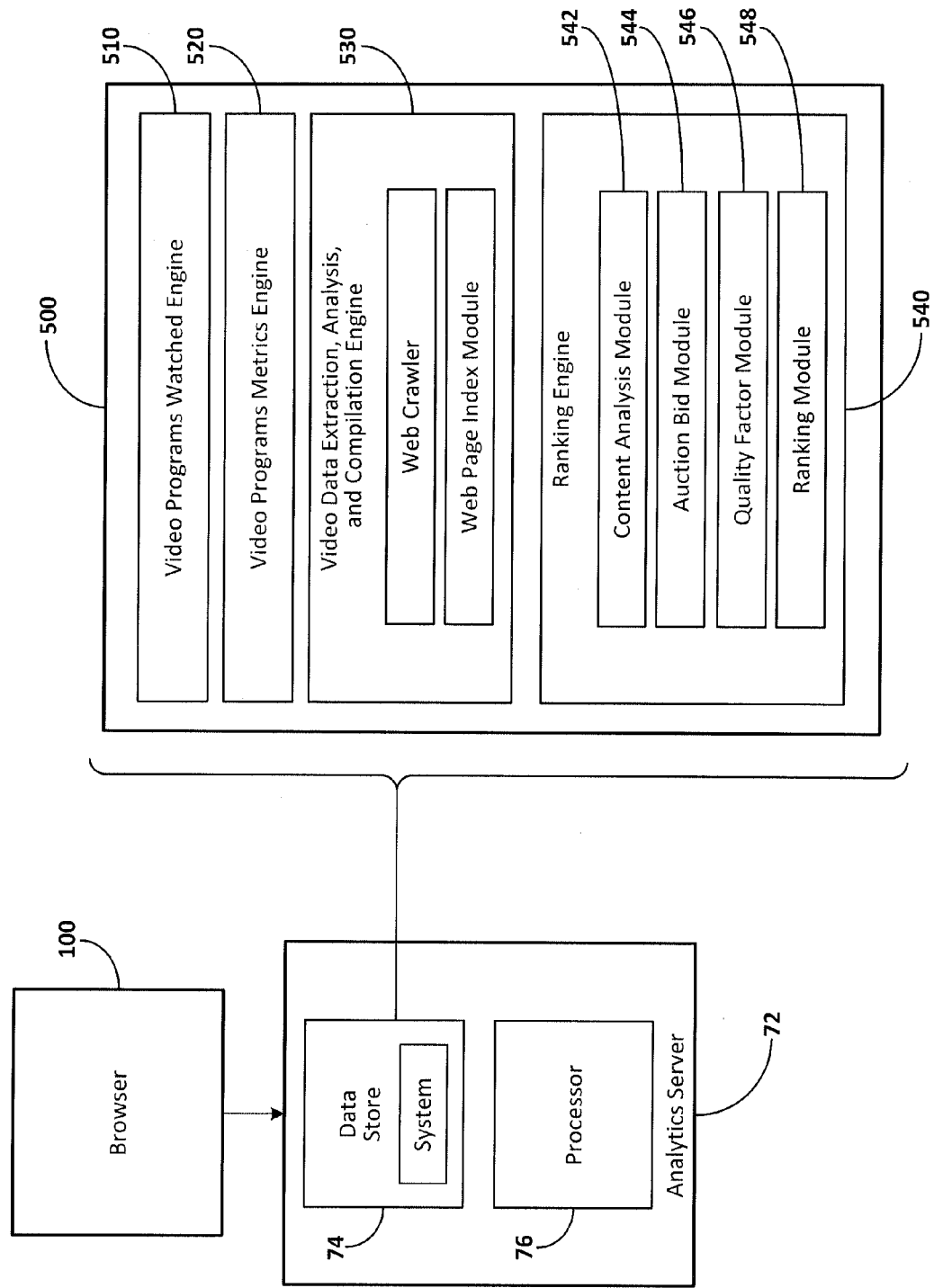
FIG. 5 is a block diagram of an example system that may provide for the display of video content segments.

FIG. 5 is a block diagram of an example video advertisement selection system that may improve selection and serving of video advertisements. FIG. 5 shows video advertisement selection system 500, which, in this example, is implemented on analytics server 72. The analytics server 72 includes data store 74 that stores the program code of system 500. However, as noted above, the video advertisement selection system may be implemented on other entities of the environment 10 shown in FIG. 1B, including being distributed among multiple entities. Furthermore, the environment 10 of FIG. 1B shows a single analytics server 72 and a single data store; however, the system 500 may be implemented on multiple servers which may access multiple data stores in a distributed and highly scalable architecture. Some data in the distributed data stores may be replicated among the multiple data stores. The data store 74 is a non-tangible computer readable storage medium. Processor 76 access the data store 74 to load and execute the program code of the system 500. The data store also includes actual video content for the promoted video programs, and corresponding metadata and video watched data for the promoted video programs. In an embodiment, the data store 74 retains this video content, metadata, and video watched data for "active" promoted video programs; i.e., for promoted video programs that companies indicate to the analytics service 70 are still to be promoted. The analytics service 70 maintains the metadata and video watched data up-to-date for these active promoted video programs. The analytics server 72 receives an input from browser 100 related to promoted video programs watched (the video watched data) through the browser 100 of, for example, media device 62. The input to, processing of, and output from the analytics server 72 is described below.

The system 500 includes a video programs watched information collection engine 510, a video program metrics engine 520, a video data extraction, analysis and compilation engine 530, and a ranking engine 540. The engine 510 receives video program watched information collected by and sent from the browser 100. The engine 510 may correlate the information with an identification (ID) of a promoted video program (i.e., a video program ID). All such promoted video programs may include a unique ID. The engine 510 may store the video program watched information in the data store 74, along with the appropriate, unique promoted video program ID. The engine 510 may update the stored information in the data store 74 as more video program watched information is received from the browser 100. The engine 510 may process some of the received information prior to storage. For example, the engine 510 may average newly received information with that currently stored in the data store 74, and store the newly averaged values in the data store 74.

The video program metrics engine 520 performs further processing and computations on the data stored in the data store 74. For example, the metrics engine 520 may compare values received from the browser 100 for a length of time a promoted video program was watched and compare this length to a threshold to determine if the promoted video program should be included as a "watched" promoted video program. As a further example, a promoted video program that is watched for half its actual length may be counted as a promoted video program. The browser 100 records and reports the viewed length of the promoted video program, and the engine 520 consults the data store 74 to apply the total length of the promoted video program and the "watched" threshold so as to determine if the promoted video program was "watched." The engine 520 also may apply weights to one or more of the collected video program metrics. The weights may be provided by a Web site publisher or video program provider, for example. The weights may be adjusted over time to optimize the weightings. For example, weights may be determined from experimentation and empirical analysis of performance of promoted video programs placed using different weights. As another example, a machine learning process may be used to analyze the promoted video program performance and adjust weights without manual intervention.

The video data extraction, analysis and compilation engine 530 extracts information from the promoted video program, such as keywords (which may appear in the title of the promoted video program, or which may be extracted by speech recognition software, for example), and other data that may be extracted by machine, such as facial recognition of human video actors, and other machine-recognition of animate and inanimate objects, and scene recognition processes. The engine 530 also may extract information (including, for example, key words) from metadata associated with the promoted video programs. The extraction engine 530 may employ various techniques for extracting the content including, for example, machine learning models, and semantic and/or statistical based algorithms. The engine 530 may extract keywords and may assign weighted values to each keyword. For each content area, for example, the extraction engine 530 may assign a value to a keyword based on parameters such as the frequency the keyword appears within the content area, the location of the keyword, the formatting style (e.g., font, alignment, color, size) of the keyword. Finally, the extraction engine 530 may extract data related to the physical characteristics of the promoted video program such as length, base sound level, contrast, and other physical characteristics.

The data produced by the extraction engine 530 may be used in several aspects. In a first aspect, the data may be used to match video advertisements to video advertisement availabilities based on common keywords between the associated promoted video program and the video advertisement request (for example, by reference to a search query term such as polar bear videos). In a second aspect, the data may be used to rank promoted video programs through the use of content factors (CF) derived from the data. The use of data for these two aspects is described below. In a third aspect, the data may be used to generate one or more physical factors (PF) that in turn may be used in ranking a promoted video program and hence its associated video advertisement.

In an alternative, the producer of the promoted video program may supply the analytics service 70 with the data and information, such as a list of keywords, the producer desires to use in characterizing the content of the promoted video program, and physical characteristics describing the promoted video program.

In an embodiment, the video data extraction, analysis and compilation engine 530 also may include Web crawler 532 and a Web page index engine 534. The Web crawler 532 traverses Web pages displaying promoted video programs and copies information related to the content of the promoted video program, and other information which is contained in blog post or comment sections of the Web pages. The Web crawler 532 also may copy metadata related to a video or to a blog. For example, a promoted video program that has multiple comments on the same blog page may be weighted because of its "popularity." Some blog posts allow other bloggers to indicate a like or dislike of the blogs, and the number of likes and dislikes may be obtained by the Web crawler 532. In an implementation, the Web crawler 532 copies the crawled Web pages and stores the Web pages in the data store 74 for later extraction, analysis, and compilation processing by the engine 530.

The Web crawler 532 may continually traverse and retrieve data from the Web pages 30 shown in the environment 10 of FIG. 1B. As described above, for the purposes of improving serving of video advertisements, the Web crawler 532 retrieves certain information and data related to comments posted with embedded videos. However, the Web crawler 532 is not limited to the collection of this information and data, and is capable of retrieving a broad range of content, including any readable and/or storable content.

To limit the amount of Web crawling, the Web crawler 532 may be directed only to those Web pages known to display active promoted video programs.

In another embodiment, data and information contained in blog and comment sections may be extracted by another search engine, such as a search engine operated by the video program provider 20, and then may be supplied to the analytics service 70.

The extraction engine 530 extracts information from each promoted video program Web page in data store 74. The extraction engine 530 scans a Web page and extracts information contextually relevant to the content of the promoted video program. In an embodiment, the extraction engine 530 also extracts information contained in blog posts and comments having an associated promoted video program.

The index engine 534 indexes data extracted from the stored Web pages into one or more search indexes associated with a search engine such as a search engine operated as part of the video program delivery system 20. For instance, the index engine 534 may separate and analyze various components of a promoted video program Web page such as embedded links, text, formal names, and metadata. The promoted video Web page data subsequently may be indexed in the search indexes according to one or more of the foregoing components. In an embodiment, the index engine 534 indexes the Web pages, and correspondingly, the promoted video programs, into the search indexes according to the keywords extracted from each Web page. Thus, in this embodiment, each promoted video program Web page stored in the search indexes includes a pre-extracted set of keywords corresponding to the content of the associated promoted video program and the Web page itself.

The ranking engine 540 includes content analysis module 542, auction bid module 544, quality factor (QF) module 546, and ranking module 548.

The content analysis module 542 determines if a promoted video program is suitable for a video advertisement request based, for example, on analysis of keywords derived from a video program search request and, optionally, the video advertisement request on the one hand, and keywords provided by the advertiser 40 or the promoted video program producer, or keywords extracted by the engine 530 for the video advertisement and its associated promoted video program. That is, the module 542 identifies candidate promoted video programs (and hence, associated video advertisements) from a pool of available, active promoted video programs (i.e., those stored in data store 74) to serve in response to an advertisement request such as may be generated when a search results Web page 30 is rendered in a browser 100 of media device 62. One criterion for identifying candidate promoted video programs may be the search query term itself. Another criterion for identifying candidate promoted video programs may be the content (e.g., subject matter) of video programs to be displayed on the search results Web page 30. The video programs may have associated metadata specifying one or more topics or concepts. Another criterion may be the overall content of the search results Web page 30 itself. Yet another criterion may be topical or concept information for the promoted video program.

The video program may be retrieved by the analytics service 70 from the video delivery system 20 and analyzed by the content analysis module 542. One or more topics or concepts to which the video program is relevant may be determined from the analysis. The content of a promoted video program then is compared to the topics or concepts of the video program. The topics and concepts may be expressed in keywords. For example, topical keywords of a video program may be compared to topical keywords of a promoted video program using, for example, keyword detection and analysis, and a score may be determined from the comparison. If the score exceeds a threshold, for example, the promoted video program may be identified as a candidate for an auction to select video advertisements to serve on the search results Web page 30.

In an embodiment, topical keywords for a video program may be determined using search engine data. For example, data related to interactions to a video program by Web site visitors 66 who were directed to the video program by a search query may be an indication of whether the search query is a good topical keyword for the video program. Interactions with the video program may include watching the video program in its entirety, watching the video program repeatedly, fast-forwarding or advancing the video program, or skipping the video program. A search engine may collect the query and interaction data anonymously and the advertiser 40 or analytics service 70 may analyze the data to determine if a search query is a good keyword for the video program. For example, on the one hand, if Web site visitors 66 who accessed a video program through a search query tended to skip the video program, then the search query may be determined to be a poor keyword for the video program. On the other hand, if the Web site visitors 66 tended to watch the video program, or to watch the video program repeatedly (during one or multiple Web site visits), the search query may be determined to be a good keyword for the video program. Good keywords may be associated with the video program and may be compared to the keywords for the promoted video programs and associated advertisements.

The bid module 544 receives bids from various advertisers for video advertisement availabilities. The bids may include a base bid and bid increments, as well as a maximum bid. The maximum bid is the most an advertiser 40 will pay for placement of a video advertisement on a Web page. Bids may change based on the location of a video advertisement slot on a Web page, for example. In an embodiment, an advertiser 40 may enter a base bid and any number of bid modifiers. An example of a bid modifier is a decrease of $0.50 from the base bid if the video advertisement is displayed in other than a most prominent position on the Web page. Another example of a bid modifier is a decrease of $0.50 from the base bid if the video advertisement is served along with other video advertisements such that the video advertisement is in competition with other video advertisements for the Web site visitor's attention. These modifiers allow an advertiser 40 to fine tune its bid based on the advertiser's value of a video advertisement placement under various conditions.

An advertiser 40 also may modify its bid based on the type of media device on which the promoted video program will be displayed. For example, the bid may be decreased if the video advertisement is served on the browser of a smartphone.

The quality factor (QF) module 546 may compute an overall score, or Quality Factor (QF) based on inputs from various components of the system 500. The Quality Factor (QF) then may be used in ranking an associated video advertisement for selection to be served on a Web page. The inputs may relate to physical characteristics of the promoted video program (Physical Factors (PF)), programs watched data related to the promoted video programs ((Programs Watched Factors (PWF)), and content of the promoted video program (Content Factors (CF)), for example.

The quality factor (QF) module 546 may receive, as an input, physical factors such as the actual, as opposed to watched, length of a promoted video program. The module 546 may assign a higher score to promoted video programs having a shorter duration, on the assumptions, for example, that (1) when a promoted video program is short, a Web site visitor 66 may have more time to view other promoted video programs, and the more promoted video programs that count as watched, the higher the revenue that may be generated by displaying a Web page; and (2) a long duration promoted video program may annoy a Web site visitor 66, who then may navigate away from the web page. The module 546 also may account for other physical factors such as the normalized volume of the video advertisement, contrast of the video advertisement, and other physical factors (PF), all of which may affect the Web site visitor's viewing experience.

The quality factor (QF) module 546 also receives inputs from the video programs watched information collection engine 510 and the video program metrics engine 520 regarding promoted video programs watched information.

Finally, the quality factor (QF) module 546 also receives inputs from the video data extraction, analysis, and compilation engine 530 as to the content of the promoted video program.

In an embodiment, the module 546 may compute Quality Factor (QF) as a combination of Physical Factors (PF), Programs Watched Factors (PWF), and Content Factors (CF). The physical factor (PF) may be computed as PF=Length Factor (LF)×Noise Factor (NF)×Contrast Factor (CoF)× . . .

$QF=PF_n \times PWF_n \times CF_n$.

In another embodiment, the module 546 may compute QF as

PF=Length Factor (LF)+Noise Factor (NF)+Contrast Factor (CoF)+

$QF=PF_n+PWF_n+CF_n$.

Other linear and non-linear combinations of terms are possible when computing QF. The various terms, including QF, may be normalized.

In an embodiment, as noted above, the Web site publisher (e.g., the video delivery system 20) may assign values to these physical factors (PFs). For example, a 2-minute promoted video program may be assigned a LF of 2.0 and a 4-minute promoted video program may be assigned a LF of 1.5.

The ranking module 548 executes a rank algorithm 550 (RANK) to rank video advertisements. The rank algorithm 550 may be of the form:

RANK=QF×bid; or

RANK=(PWF*PF*CF)×bid, where the operator * refers to a means for combining the factors, including multiplication and addition.

However, the RANK algorithm may use other terms, and may be computed as other linear and non-linear combinations of terms.

Following is an example of promoted video program watched metrics whose values may be collected by the browser 100 or may be provided by the advertiser/Web site publisher, and which may be used by the system 500 to rank video advertisements for service selection on a Web page:

Video plays—the number of unique plays of a video advertisement.

Video pauses/stops—the number of pauses without restart, and the number of stops of a promoted video program. A promoted video program may be stopped by operation of a stop button, closing a browser, opening a new tab, navigating to another Web page, and turning off the media device.

Video played length—the amount of time that the promoted video program actually played when in a viewable position in a media device/browser window. If a browser is minimized, the video advertisement may stop playing. If the browser is down-sized and the promoted video program is not visible, even if the video advertisement continues to play, the video played length may not be counted.

Video replays—a number of times a promoted video program is replayed during a current Web page display.

Video noise level—the expected or design noise level of a promoted video program without considering operation of a mute button or operation of an audio level slide.

Video length—the actual length of a promoted video program in units of time.

Video full screen maximizing, downsizing, and minimizing—the size of the browser window during play of a promoted video program.

Video volume mute—muting of a promoted video program.

Visitor actions taken during play of a promoted video program—include activating a link during play of a promoted video program.

Visitor actions taken after play of a promoted video program—include activating a link after play of a promoted video program.

Some of the above metrics may be used in computation of the quality factor (QF) of the RANK algorithm. In an embodiment, video advertisement length is included in the QF term.

FIGS. 6-9 are flowcharts illustrating example processes for selecting and serving video content segments at online resources. The processes shown in FIGS. 6-9 are based on the environments of FIGS. 1A and 1B, the online resources of FIGS. 2A-4D, and the system 500 of FIG. 5.

Figure 6:
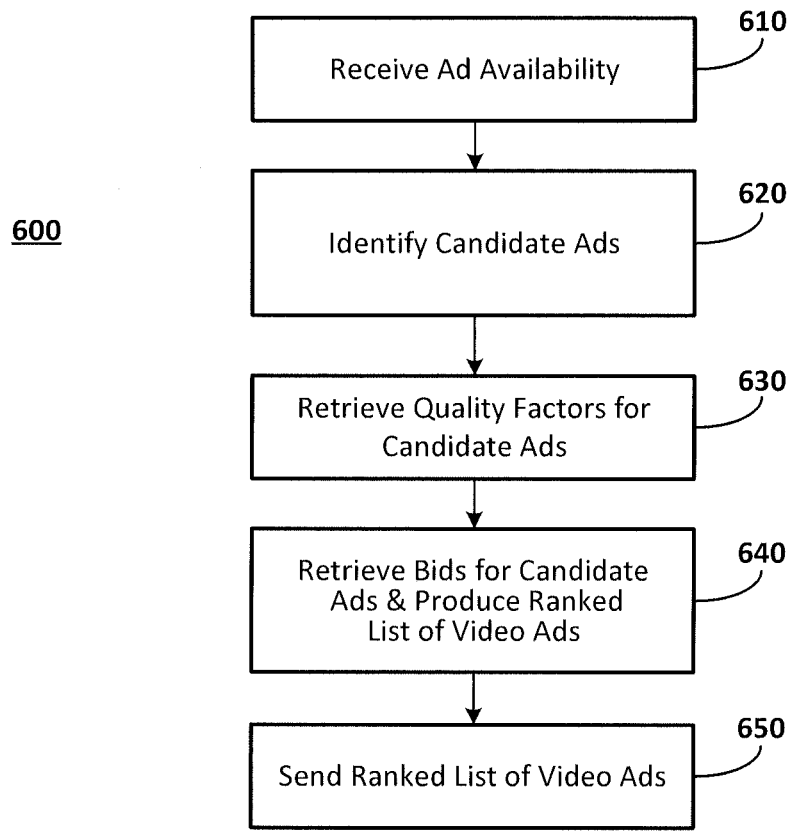
FIGS. 6-9 are flowcharts illustrating example processes for selecting and serving video content segments at online resources.

In FIG. 6, process 600 begins in block 610 when ad server 42 receives an advertisement availability (e.g., through an ad request) from the video delivery system 20 for a video advertisement to display on Web page 30. The advertisement availability may include one or more keywords that may be used to select an appropriate video advertisement. For example, the advertisement request may include keywords from a search term submitted by a Web site visitor 66. In block 620, the ad server 42 identifies video advertisements that match the keywords provided with the video advertisement request to establish a first set of candidate video advertisements. In block 630, ad server 42 retrieves, where possible, a quality factor (QF) for each of the video advertisements in the first set of candidate advertisements. In block 640, the ad server 42 retrieves bid information for each of the video advertisements and applies the bid information to produce a final ranked list of video advertisements. In block 650, the ad server 42 sends information for video advertisements, including the final ranked list of video advertisements, to fulfill the ad request to the Web server 24. Alternately, in block 650, the ad server 42 selects as many video advertisements as necessary to satisfy the ad request, and sends the selected video advertisements to the Web server 24. The process 600 then ends.

Figure 7:
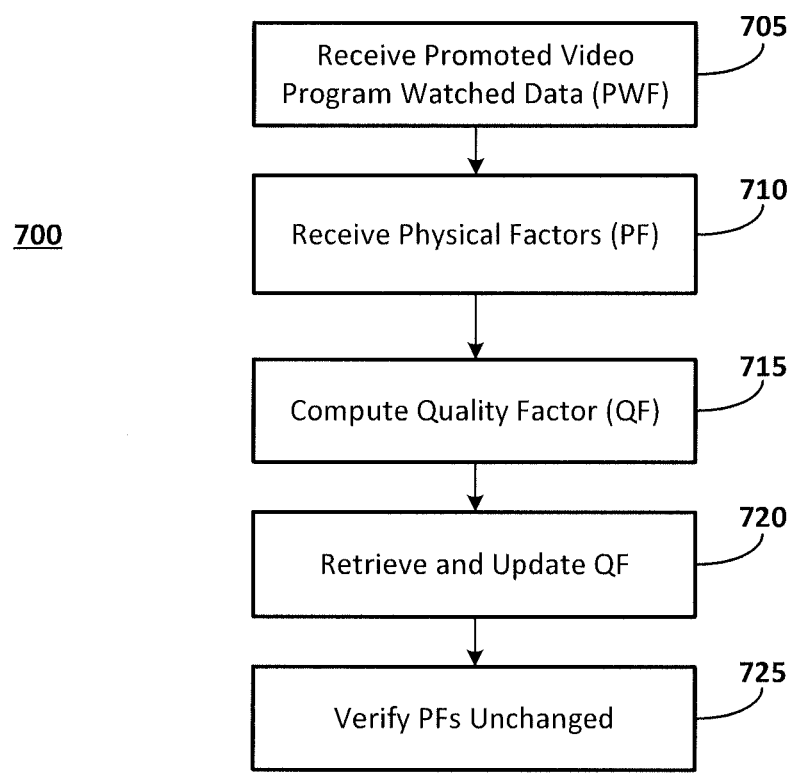

FIG. 7 illustrates process 700 in which analytics server 72 computes a quality factor (QF) for a video advertisement according to the RANK algorithm. In block 705, the analytics server 72 receives promoted video program watched data and a video ID for the promoted video program from browser 100. In block 710, the analytics server 72 receives physical characteristics data (e.g., length, noisiness, contrast) from the ad server 42. In block 715, the analytics server 72 computes the quality factor (QF) according to previously determined weights for the video advertisement as identified by the video ID. In an embodiment, the QF is computed without using the physical characteristics data; i.e., without including a value for the length of the video advertisement, for example. In another embodiment, the physical characteristics data are used in computing the QF. In block 720, the analytics server 72 retrieves a previously stored value for QF for the promoted video program as identified by the video ID, and updates and stores the updated value for QF. In block 725, the analytics server 72 verifies that the physical characteristics have not changed for the promoted video program.

Figure 8:
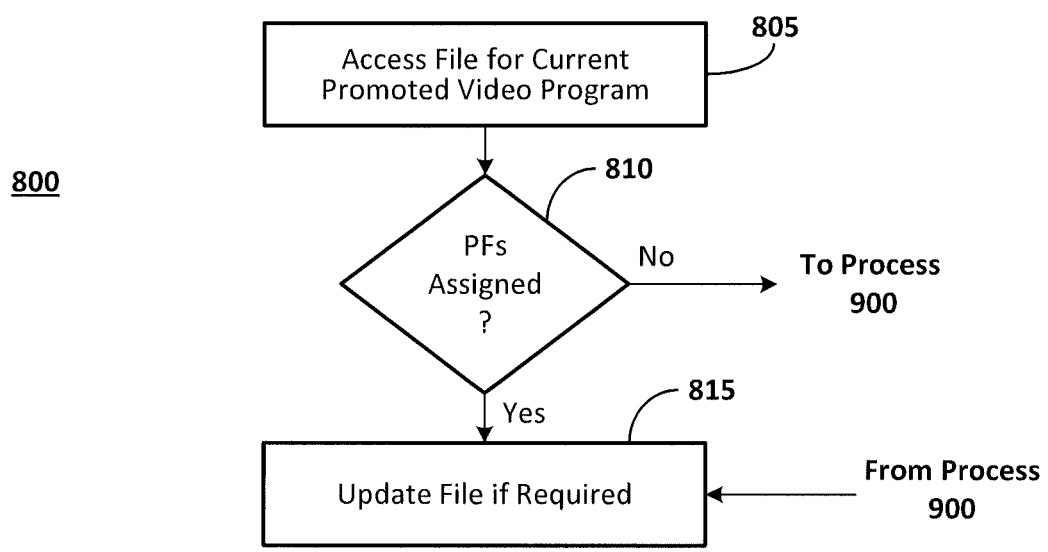

FIG. 8 illustrates an example process 800 to account for the physical factors (PF) of a promoted video program to be used in the RANK algorithm. The PF calculation process may be executed by the ad server 42 or the Web server 24. In another embodiment, the analytics server 72 may execute the process 800. In FIG. 8, process 800 is shown implemented on the ad server 42. In block 805, the ad server 42 accesses a file for a current promoted video program as stored in repository 43. In block 810, the ad server 42 determines if the promoted video programs already have assigned, a full range of physical factors (e.g., the promoted video program producer may provide these data with the promoted video program or in a separate file referenced by the promoted video program identification (ID). If the promoted video program file includes the desired physical characteristics data, the process 800 moves to block 820. In block 810, if the promoted video program file does not have assigned physical characteristics, or if the physical characteristics are not complete, the process 800 moves to process 900, and the ad server 42 processes the promoted video program to determine the desired physical characteristics (e.g., length, volume, contrast). The process 800 then moves to block 815 and the ad server 42 updates the file in the repository 43. The process 800 then ends.

Figure 9:
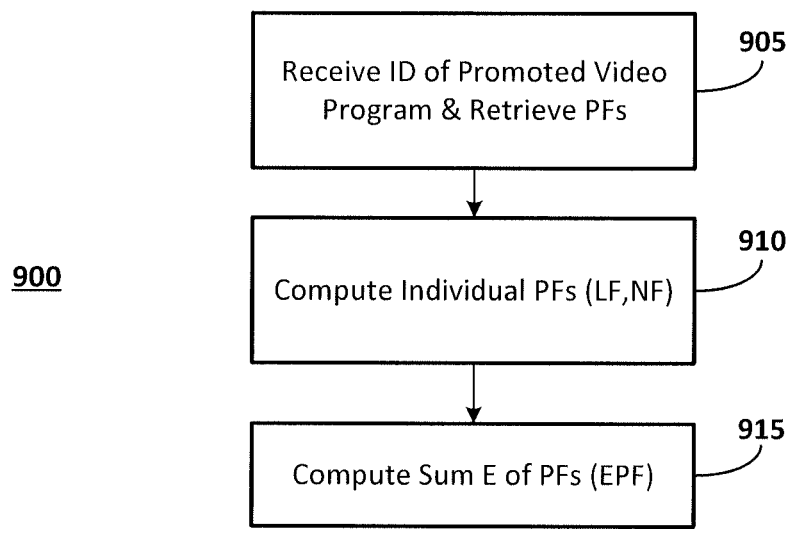

FIG. 9 illustrates process 900 for computing physical factors (PF) based on physical characteristics for a promoted video program. In block 905, the system 500 receives the identification of a promoted video program and retrieves the associated physical characteristics. In the example process 900, a first physical characteristic considered is the length of the promoted video program; although other physical characteristics may be considered by the system 500, in FIG. 9, computation of only the length factor (LF) is described. In block 910, the system 500 is programmed to assign higher LF values to a promoted video program having shorter lengths. However, other programming schemes may be used. The system 500 also may consider the average length of the search videos, a maximum length, or a length of the primary search video. The system 500 then may select promoted video programs that would result in maximum revenue if all were played. As a further example, if the main search video has a length of 5 minutes, the Web operator 20 may prefer that the promoted video programs not exceed, in their cumulative length, 5 minutes. In this example, the system 500 may select several short (e.g., 1 minute) promoted video programs as opposed to a single 5-minute promoted video program if the revenue derived from playing all or a portion of the five short promoted video programs exceeds that of the 5 minute promoted video program. One way to accomplish this is to assign higher LFs to shorter promoted video programs. For example, the system 500 could provide a length factor (LF) of 1.4 for a 1 minute promoted video program and a LF of 1.2 for a 2 minute promoted video program. Other PFs, including factors for noise and contrast, also may be provided. In block 915, the system 500 computes a sum of the PFs ($\Sigma$ PF) for each candidate promoted video program. The process 900 then ends.

As may be appreciated by reference to FIGS. 6-9, the selection of video advertisements to serve on a particular Web page may be an iterative process. For example, the value of max·bid may be replaced by a starting bid with incremental modifiers. As another example, the bid or auction process may results in lowering the actual bid amount of a selected video advertisement (i.e., a highest bid) to a value that is just one increment above that of the next highest bid.

As also may be appreciated by reference to FIGS. 6-9, the process for the selection of video advertisements, including the computation of the RANK algorithm, to serve on a particular Web page may be distributed over many different entities, or may be combined into one entity.

Certain of the devices and components shown in FIGS. 1A, 1B, and 5 include a computing system. The computing system and its components include the circuitry to perform the method steps of the claims that follow, and that are described with respect to FIGS. 6-9. The computing system includes a processor (CPU) and a system bus that couples various system components including a system memory such as read only memory (ROM) and random access memory (RAM), to the processor. Other system memory may be available for use as well. The computing system may include more than one processor or a group or cluster of computing system networked together to provide greater processing capability. The system bus may be any of several types of bus structures including a memory bus or memory controller, a peripheral bus, and a local bus using any of a variety of bus architectures. A basic input/output (BIOS) stored in the ROM or the like, may provide basic routines that help to transfer information between elements within the computing system, such as during start-up. The computing system further includes data stores, which maintain a database according to known database management systems. The data stores may be embodied in many forms, such as a hard disk drive, a magnetic disk drive, an optical disk drive, tape drive, or another type of computer readable media which can store data that are accessible by the processor, such as magnetic cassettes, flash memory cards, digital versatile disks, cartridges, random access memories (RAM) and, read only memory (ROM). The data stores may be connected to the system bus by a drive interface. The data stores provide nonvolatile storage of computer readable instructions, data structures, program modules and other data for the computing system.

To enable human (and in some instances, machine) user interaction, the computing system may include an input device, such as a microphone for speech and audio, a touch sensitive screen for gesture or graphical input, keyboard, mouse, motion input, and so forth. An output device can include one or more of a number of output mechanisms. In some instances, multimodal systems enable a user to provide multiple types of input to communicate with the computing system. A communications interface generally enables the computing device system to communicate with one or more other computing devices using various communication and network protocols.

The preceding disclosure refers to a flow chart and accompanying description to illustrate the embodiments represented in FIGS. 6-9. The disclosed devices, components, and systems contemplate using or implementing any suitable technique for performing the steps illustrated. Thus, FIGS. 6-9 are for illustration purposes only and the described or similar steps may be performed at any appropriate time, including concurrently, individually, or in combination. In addition, many of the steps in the flow charts may take place simultaneously and/or in different orders than as shown and described. Moreover, the disclosed systems may use processes and methods with additional, fewer, and/or different steps.

Embodiments disclosed herein can be implemented in digital electronic circuitry, or in computer software, firmware, or hardware, including the herein disclosed structures and their equivalents. Some embodiments can be implemented as one or more computer programs, i.e., one or more modules of computer program instructions, encoded on computer storage medium for execution by one or more processors. A computer storage medium can be, or can be included in, a computer-readable storage device, a computer-readable storage substrate, or a random or serial access memory. The computer storage medium can also be, or can be included in, one or more separate physical components or media such as multiple CDs, disks, or other storage devices. The computer readable storage medium does not include a transitory signal.

The herein disclosed methods can be implemented as operations performed by a processor on data stored on one or more computer-readable storage devices or received from other sources.

A computer program (also known as a program, module, engine, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network.

We claim:

1. A method, executed on a processor, for serving a video content segment at an online resource, comprising:
   receiving, by the processor, a request for a video content segment;
   identifying, by the processor, one or more candidate video content segments in response to the request;
   accessing, by the processor, a quality factor (QF) and a bid for each of the candidate video content segments;
   ranking, by the processor, the candidate video content segments based at least on a combination of each of the video content segments' QF and bid; and
   providing, by the processor, in response to the request, a set of candidate video content segments based on the ranking,
   wherein the video content segments are video advertisements for promoted video programs, and
   the QF comprises content factors (CF), programs watched factors (PWF) and physical factors (PF), wherein computing QF=PWF*CF*PF, and wherein the physical factors (PF) include a length of the promoted video program, and wherein a short length of a promoted video program increases a rank of a video advertisement.

2. The method of claim 1, further comprising computing the PWF, comprising:
   receiving data indicative of one or more user interactions with the promoted video program;
   computing a weighted score for each of the one or more user interactions; and
   summing the weighted scores.

3. The method of claim 2, wherein the user interactions comprise pauses/stops, played length, replays, viewing screen maximizing, volume mute, activating a link; and indicated likes and dislikes; and wherein positive user interactions including replays, screen maximizing, activating a link, and indicating likes increases a computed value of the PWF.

4. The method of claim 1, wherein the physical factors further include noise level and contrast.

5. The method of claim 1, wherein the content factors (CF) include a relevance of the video program to the request, wherein the higher the relevance, the higher the value of CF, and wherein the processor determines relevance by determining a degree of matching of keywords in the request to keywords in the video program.

6. The method of claim 1, wherein the bid is a base bid plus one or more bid increments.

7. The method of claim 1, wherein the bid is a maximum bid.

8. A method, executed on a processor, for maximizing revenue from video advertisements served at an Internet Web site, comprising:
   receiving, by the processor, a request for a video advertisement on a Web page;
   selecting, by the processor, an initial set of candidate video advertisements based on content information derived from the Web page;
   ranking, by the processor, each candidate video advertisement in the initial set of candidate video advertisements, comprising:
      receiving a programs watched factor (PWF) for each candidate video advertisement,
      receiving a content factor (CF) for each candidate video advertisement, and receiving a bid for one or more of the candidate video advertisements;
   selecting, by the processor, one or more of the ranked candidate video advertisements to serve on the Web page;
   computing the physical factors (PF) for a promoted video program associated with each candidate video advertisement; and
   computing RANK=PWF*CF*PF*bid, wherein the shorter a length of a promoted video program, the higher a value of PF for the video advertisement.

9. The method of claim 8, wherein receiving the programs watched factor (PWF) comprises computing the PWF by:
   receiving, by the processor, one or more metrics values based on data recorded from user interactions while watching the promoted video program;
   applying, by the processor, a weighting factor to each of the received metrics values;
   computing, by the processor, an interim programs watched factor (iPWF) based on the weighted metrics values; and
   normalizing, by the processor, the iPWF to produce the programs watched factor (PWF).

10. The method of claim 9, wherein the processor receives the metrics values from a media device displaying the promoted video program, and wherein the metrics values relate to one or more of pauses/stops, played length, replays, viewing screen maximizing, volume mute, activating a link; and indicating a like/dislike.

11. The method of claim 8, wherein selecting, by the processor, an initial set of candidate video advertisements based on content information derived from the Web page comprises matching topical keywords associated with content of the Web page to topical keywords derived from each of the video advertisements and their associated promoted video programs.

12. The method of claim 11, wherein the content of the Web page comprises content of a video program provided on the Web page.

13. The method of claim 12, wherein receiving the CF for each candidate video advertisement comprises computing the CF by the processor, and wherein computing the CF by the processor comprises determining a relevance of the topical keywords associated with the content of the Web page and keywords associated with the promoted video programs.

14. The method of claim 11, wherein the content of the web page comprises a search query submitted to retrieve the Web page.

15. A system for selecting video advertisements to serve at an Internet Web site, comprising:
a processor; and
a computer-readable storage medium comprising a program of instructions for selecting and serving the video advertisements, wherein the processor executes the program of instructions to:
receive a request for a video advertisement on a Web page;
select a set of candidate video advertisements based on content information derived from the Web page; and
rank each candidate video advertisement in the set of candidate video advertisements, comprising:
receiving one or more physical factors (PF), wherein the physical factors include a length factor (LF) related to a length of a promoted video program linked to a video advertisement, and wherein a shorter the length of the promoted video program, the higher a value of LF for the video advertisement;
receiving a content factor (CF);
receiving a programs watched factor (PWF);
computing a quality factor (QF) for each candidate video advertisement, wherein computing QF=PWF*CF*PF,
receive a bid for one or more of the candidate video advertisements, and
rank each of the candidate video advertisements by computing RANK for each of the candidate video advertisements based on a combination of QF and bid for each of the candidate video advertisements for which a bid was received; and
select one or more of the ranked candidate video advertisements to serve on the Web page.

16. The system of claim 15, wherein to receive the quality factor (QF), the processor:
receives one or more metrics values based on data recorded from user interactions while watching a promoted video program;
combines the metrics values to produce a normalized value of the programs watched factor (PWF); and
uses the normalized PWF to compute the quality factor (QF).

17. The system of claim 16, wherein the processor receives the metrics values from a media device displaying the video advertisement, and wherein the metrics values relate to one or more of pauses/stops, played length, replays, viewing screen maximizing, volume mute, activating a link, and indication of a like or dislike.

18. The system of claim 15, wherein the processor selects the set of candidate video advertisements based on the content information derived from the Web page matching content information derived from each of the video advertisements.

19. The system of claim 18, wherein the content of the Web page comprises content of a video program provided on the Web page.

20. The system of claim 19, wherein the content of the video program is provided in metadata specifying one or more topics and concepts, the metadata linked to the video program.

21. The system of claim 18, wherein the content of the Web page comprises display area content information in a video program display area of the Web page, the display area content information including keyword information, the keyword information comprising frequency of the keyword appearing in the display area, location of the keyword in the display area, formatting style of the keyword; and matching of the keyword to a search query keyword.

22. The system of claim 21, wherein the display area comprises a blog section, and wherein the display area content information further comprises information contained in a blog post of the blog section.

23. The system of claim 15, wherein in selecting video advertisements to server, the processor further: receives an identification of a type of media device displaying the video advertisements; and selects the video advertisements based on the received identification.

24. The system of claim 23, wherein the media device is identified as a mobile phone, and wherein the processor selects a video advertisement on a basis of a shorter length than other candidate video advertisements.

\* \* \* \* \*